United States Patent [19]
Beming et al.

[11] Patent Number: 5,931,964
[45] Date of Patent: Aug. 3, 1999

[54] METHOD AND ARRANGEMENT FOR CHANNEL ALLOCATION IN A RADIO COMMUNICATIONS SYSTEM

[75] Inventors: Per Johan Beming, Stockholm; Dalibor Turina, Täby, both of Sweden

[73] Assignee: Telefonaktiebolaget LM Ericsson, Stockholm, Sweden

[21] Appl. No.: 08/801,694

[22] Filed: Feb. 14, 1997

[30] Foreign Application Priority Data

Feb. 16, 1996 [SE] Sweden .................................. 9600578

[51] Int. Cl.$^6$ .................................................. G08C 25/02
[52] U.S. Cl. ......................... 714/748; 370/331; 370/332; 370/442
[58] Field of Search .............................. 371/32; 370/331, 370/332, 442

[56] References Cited

U.S. PATENT DOCUMENTS

| | | | |
|---|---|---|---|
| 4,472,802 | 9/1984 | Pin et al. ................................. | 370/104 |
| 5,157,709 | 10/1992 | Ohteru ...................................... | 379/58 |
| 5,280,472 | 1/1994 | Gilhousen et al. ........................ | 370/18 |
| 5,430,760 | 7/1995 | Den .......................................... | 375/200 |
| 5,502,721 | 3/1996 | Pohjakallio ............................. | 370/60.1 |
| 5,574,974 | 11/1996 | Almgren et al. ........................ | 455/33.1 |
| 5,634,190 | 5/1997 | Wiedeman .............................. | 455/13.1 |
| 5,796,742 | 8/1998 | Klotzbach et al. ...................... | 370/466 |

FOREIGN PATENT DOCUMENTS

| | | |
|---|---|---|
| 0 332 825 A2 | 9/1989 | European Pat. Off. . |
| 0 333 679 A1 | 9/1989 | European Pat. Off. . |

OTHER PUBLICATIONS

Swales et al., "Multi–Beam Adaptive Base–Station Antennas For Cellular Land Mobile Radio Systems", IEEE, pp. 341–348, 1989.

Hjern, "Base Station Diversity, NMT–900", IEEE, pp. 310–313, 1988.

Dunlop et al., "Speech Traffic Capacity of Idle—Signal Casting Multiple Access With Collision Detection (ICMA/CD) for Cellular Mobile Radio", IEEE, pp. 1–5, 1989.

Forture et al., "Transmission of SBC Speech Via 16–Level QAM Over Mobile Radio Channels", IEEE, pp. 26.6.1–26.6.5, 1988.

*Primary Examiner*—William Grant
*Assistant Examiner*—McDieunel Marc
*Attorney, Agent, or Firm*—Burns, Doane, Swecker & Mathis, L.L.P.

[57] ABSTRACT

The present invention relates to a method and an arrangement for channel allocation in a radio communication system in which data is transmitted between two stations over two or more radio channels. Data is communicated as packets which are divided into blocks while the transmission follows a protocol for automatic re-transmission of data that have been erroneously transmitted. In accordance with the proposed method, channels for re-transmission are allocated with respect to a transmission parameter which has been created at a previous transmission and which is based upon information of the result of said previous transmission. The transmission parameter is aimed to ensure that re-transmission is performed via those channels which have the highest probability of transmitting data correctly. The channels which had the highest transmission quality in said previous transmission are expected to have the highest transmission quality also by re-transmission.

46 Claims, 18 Drawing Sheets

Fig. 10
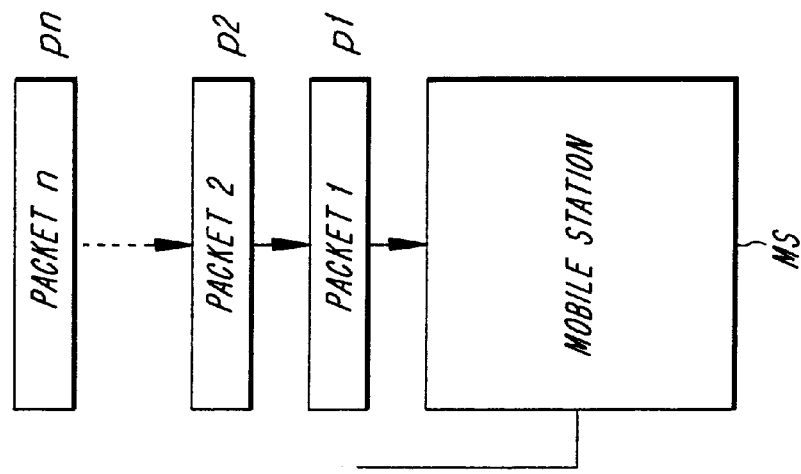
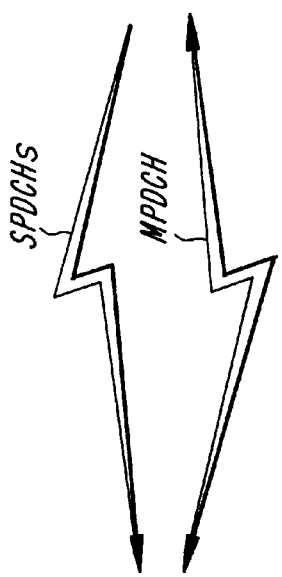
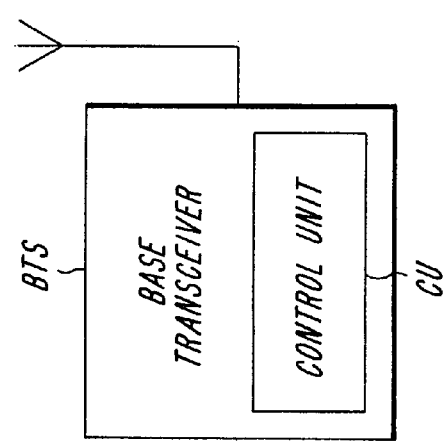

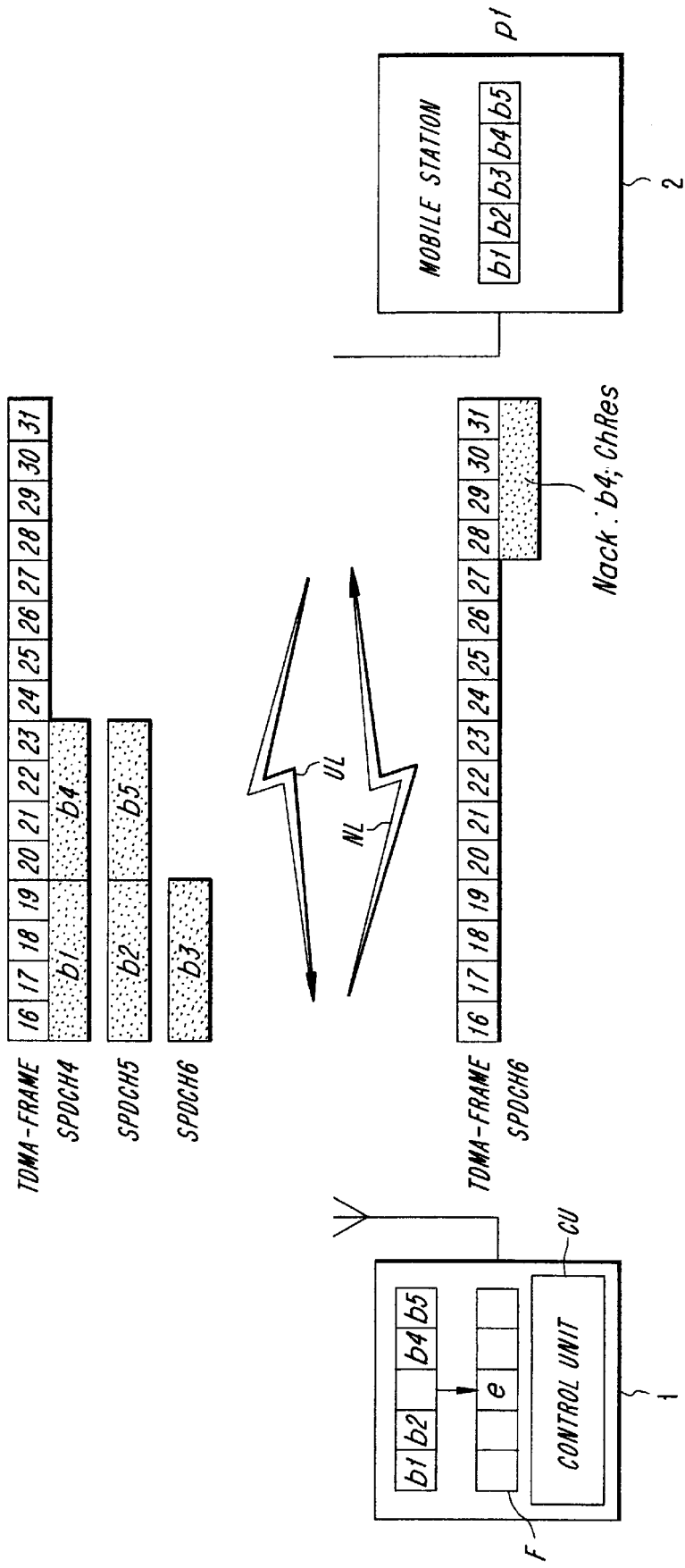

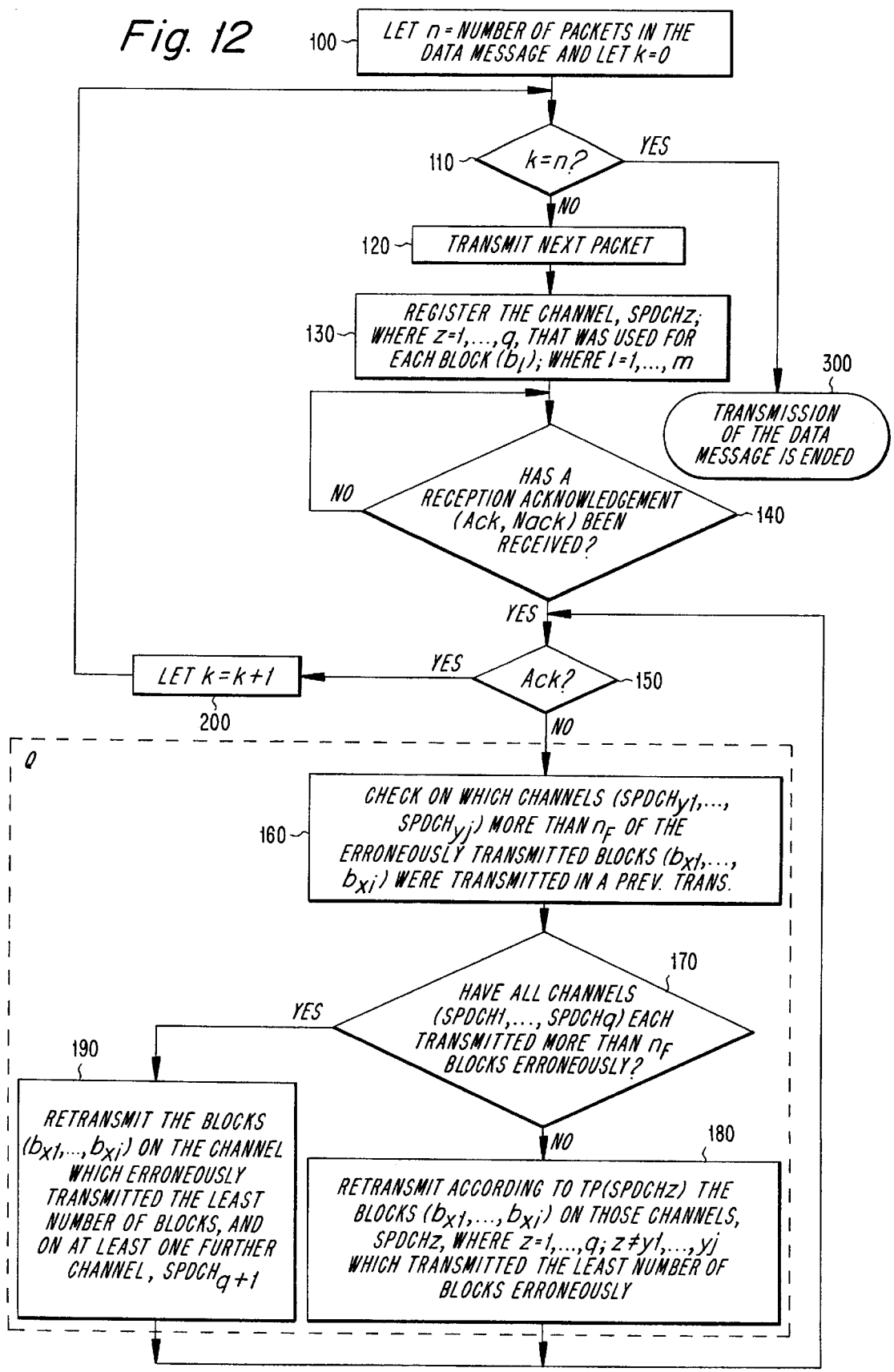

METHOD AND ARRANGEMENT FOR CHANNEL ALLOCATION IN A RADIO COMMUNICATIONS SYSTEM

BACKGROUND

The present invention relates to a method for channel allocation in a radio communications system in which data is transmitted as packets in accordance with a protocol for the automatic re-transmission of erroneously transmitted data. More specifically, the invention relates to a method for channel allocation in the transmission of erroneously transmitted data. Packet transmission of data over radio channels is applied in a GSM system (GSM=Global System for Mobile communication) for instance. The radio channels may be frequency division multiple access channels (FDMA), time division multiple access channels (TDMA) or code division multiple access channels (CDMA).

The invention also relates to an arrangement and to a base station controller for carrying out the method.

In a mobile radio communications system for data package transmission, a base station is able to communicate with one or more mobile stations through the medium of one or more time-divided channels between the base station and the mobile station. A time-divided channel is divided into time slots. A data burst comprising a plurality of information bits can be transmitted in each time slot. Data that is transmitted in a packet switching radio communications system is divided into one or more packets, which in turn comprise one or more blocks. Depending on the application and system concerned, the blocks may be the smallest data unit that are transmitted via the radio interface.

In data transmission, where, in contradistinction to speech transmission, no errors can be tolerated in the transmitted messages there can be used a protocol for the automatic re-transmission of erroneously transmitted data. The most common solution involves the use of an ARQ protocol (ARQ=Automatic Repeat reQuest). This protocol implicates a return channel on which information concerning the status of a transmitted message can be transmitted. The receiver discloses via the return channel whether or not a given message has been transmitted correctly. When certain blocks in a packet have been transmitted erroneously, so-called selective ARQ enables solely the erroneous blocks to be retransmitted without needing to retransmit the remaining blocks in the packet.

Increasing requirements on high bit rates and short delays have resulted in a greater need for communications systems of large bandwidth. This need can either be satisfied with one single channel of very large bandwidth or by combining a plurality of narrowband channels such that the channels together provide the desired bit rate and delay. One example of this latter solution is the general packet radio service (GPRS) which ETSI SMG (ETSI=European Technical Standards Institute; SMG=Special Mobile Group) is in the process of specifying as a part of GSM phase 2+. Those channels that are used for data transmission within such a radio communications system, e.g. the cellular GSM system, will very probably have highly varying qualities.

GB-A-2 279 205 teaches a packet data transmission radio system in which a mobile terminal monitors a parameter which discloses an anticipated communications quality for each channel. The parameter is based on statistical measurements of the signal strength of the desired signal C in relation, C/I, to the signal strength of an interfering signal, I, preferably in those time slots in which data is transmitted. The parameter is utilized when a mobile terminal initially informs a base station of those time slots in which the mobile terminal wishes to communicate data, when establishing a radio connection with said base station. The base station then reserves these time slots for communication with the mobile terminal, provided that the desired time slots are available at that time.

Patent Specification WO-A1-93/14579 discloses an algorithm according to which channels are allocated in a radio communications system. The algorithm utilizes earlier registered events on the channels concerned for generating a list in which the channels are ranked in a descending order of quality. When allocating a new channel for communication between a base station and a mobile station, the base station chooses the top available channel on the list. Examples of events that are recorded during a given time period are the number of interrupted calls, the number of completed calls and the number of blocked requests for a call setup. When allocating channels, the algorithm also takes into account whether or not a certain channel is heavily loaded locally.

The present invention provides a solution to those problems caused by the aforesaid greatly varying channel qualities, and also constitutes an improvement in relation to the aforesaid known techniques. In a radio communications system for transmitting data between two stations that communicate data over two or more channels in accordance with a protocol for the automatic re-transmission of erroneously transmitted data, the invention attacks the problem of allocating the most effective channels for the automatic re-transmission of erroneously transmitted data, in other words those channels on which there is the greatest probability of re-transmitting the data correctly.

The channels utilized in the radio communications system may be frequency divided, such as in an FDMA system (FDMA=Frequency Division Multiple Access), for instance NMT (NMT=Nordic Mobile Telephone), or may be time divided, such as in pure TDMA (TDMA=Time Division Multiple Access). One example of combined TDMA and FDMA is GSM, in which a given channel is characterized by a specific time slot on a separate carrier frequency. The channels may also be separated with the aid of a spread code sprectrum which is unique for each channel, such as in a CDMA system (CDMA=Code Division Multiple Access), for instance IS-95.

According to GB-A-2 279 205, the mobile terminal states in its access request to the base station those channels that are preferred by the mobile terminal. The present-day TDMA system is unable to handle an access request of the length that this would require. For instance, the access request in GSM is comprised solely of eight bits. Thus, in order to apply the solution proposed by GB-A-2 279 205 in a GSM system, it would be necessary to lengthen the access request, which would, in turn, result in greater delays. According to GB-A-2 279 205, the mobile terminal determines the quality of solely the downlink of the channel, i.e. when data is transmitted from the base station to the mobile terminal. Consequently, the measurements do not provide sufficient basis on which the channel quality on the uplink can be estimated, i.e. when data is transmitted from the mobile terminal to the base station.

The algorithm described in WO-A1-93/14579 is based on events recorded during a given time period and provides a mean value quality measurement. In the transmission of data when relatively large volumes of information are transmitted in a relatively short time, it is essential to choose precisely that channel or that set of channels which will give the highest transmission quality at that moment in time. Because the algorithm described in WO-A1-93/14579 gives a mean value of the historic quality of the radio channels, the algorithm does not provide a suitable solution for allocating channels for the re-transmission of data which were erroneously transmitted in a previous data transmission.

Accordingly, one object of the present invention is to provide methods and arrangements for finding that channel or that set of channels which will, at that moment in time, provide the highest transmission quality in the re-transmission of erroneously transmitted data.

This object is achieved in accordance with the proposed method, by selecting a transmission parameter with each transmission. The transmission parameter is derived with the aid of information relating to the channel used for transmitting each given data. At least one of the preceding channels for earlier transmitted data is used in the re-transmission of data.

The proposed arrangement creates a transmission parameter in a control unit for each transmission, this parameter being derived with the aid of information relating to the channel used for transmitting each given data. The channel allocating means in the control unit allocates at least one of the preceding channels used for earlier transmitted data for the re-transmission of erroneously transmitted data, in accordance with the transmission parameter.

In the case of erroneously transmitted data, channels are allocated for re-transmission of data in accordance with the transmission parameter that has been created in a previous transmission. According to one preferred embodiment of the first method according to the invention, the transmission parameter discloses those channels whose quality has exceeded a predetermined limit value in the transmission of data between a primary station and a specific secondary station.

According to one advantageous embodiment, the aforementioned previous transmission may be the immediately preceding transmission of data between the primary station and the secondary station.

According to another preferred embodiment, data is re-transmitted primarily on those channels whose transmission quality has exceeded a predetermined value. This value can be given as the highest number of errors, $n_F$, that may be accepted on a given channel in order for this channel to be allocated for the possible re-transmission of erroneously transmitted data. When all of the previously used channels have transmitted data containing more errors than $n_F$, at most one of these channels is allocated for re-transmission of the data. The channel that has transmitted data with the lowest number of errors is preferably allocated. In addition, at least one further channel that has not been used in an earlier transmission is allocated, provided that such a channel is available.

According to an alternative embodiment, there can be calculated for each channel used in a previous transmission a quality measurement, Q, calculated in accordance with $$Q = \frac{N_{tot} - N_{Nack}}{N_{tot}};$$

where $n_{tot}$ represents the total number of blocks that have been transmitted on the channel, and where $n_{Nack}$ denotes the number of erroneously transmitted blocks on the channel. When retransmitting erroneous data, there is allocated at most one of the previous channels whose quality measurements Q are below a predetermined quality limit $Q_1$. If the Q value of all the channels used in a previous transmission are below Q, there is allocated for re-transmission at least one further channel which has not been used in a previous transmission, provided that such a channel is available.

The invention also relates to a base station switching centre in a radio communications system, which utilizes the method and the arrangement according to the invention. Data is transmitted between a primary and a secondary station in the radio communications system via two or more channels and the data is transmitted in accordance with a protocol for the automatic re-transmission of erroneously transmitted data.

One embodiment of the inventive arrangement presumes that each data message is divided into one or more packets, each of which includes one or more blocks. In this case, the re-transmission of erroneously transmitted data is effected in each block, so as to avoid those channels on which an excessive number of blocks or an excessively high percentage of blocks have been transmitted erroneously.

According to a further embodiment of the inventive arrangement, the arrangement includes a control unit in which the transmission parameter is created. The control unit includes channel allocating means in the form of a processor and a memory unit. The processor is used when creating the transmission parameter, this parameter then being stored in the memory unit at least until a receipt acknowledgement has been received to the effect that the whole packet in which the relevant blocks are included has been transmitted correctly.

By re-transmitting erroneously transmitted data solely on those channels of good quality, it is possible to reduce the total data message transmission time and to therewith enhance the capacity of the data transmission system.

BRIEF DESCRIPTION OF THE DRAWINGS

FIG. 10 illustrates generally the manner in which a secondary station in the radio communications system according to FIG. 1 transmits a message to a primary station in the same system;

FIGS. 11a–c illustrate the signalling procedure prior to and during the transmission of a message from a given secondary station to a primary station, in accordance with the inventive method;

FIG. 12 is a flowchart illustrating an inventive method for application when data transmission is terminated in a mobile station;

The invention will now be described in more detail with reference to preferred exemplifying embodiments thereof and also with reference to the accompanying drawings.

DETAILED DESCRIPTION

Figure 1:
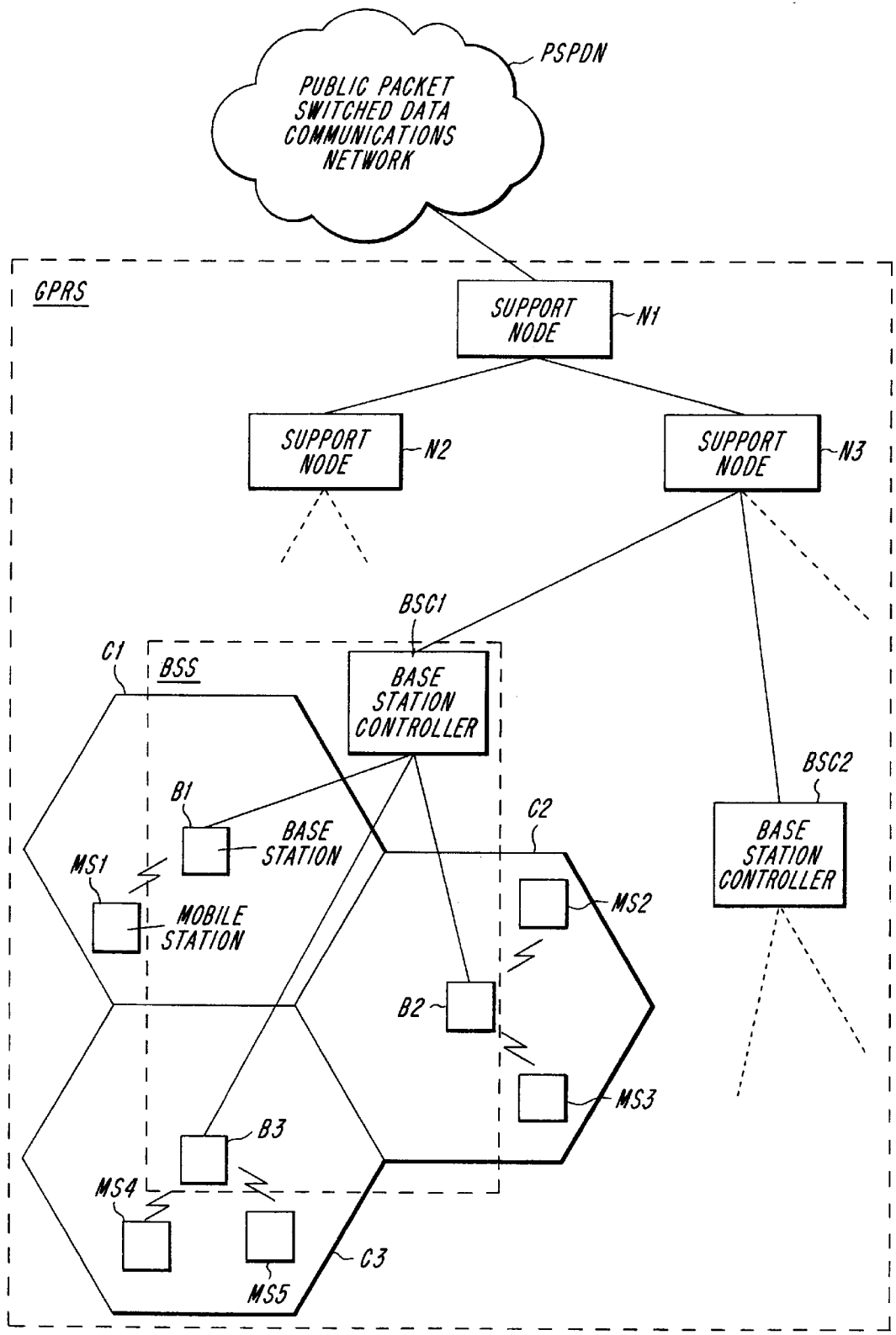
FIG. 1 illustrates a known mobile radio communications system with associated nodes and connecting a packet-switching telecommunications network.

FIG. 1 illustrates a public packet switched data transmission network PSPDN and a mobile radio communications system for GPRS (GPRS=General Packet Radio Service), in which the inventive method is applied. GPRS couples the radio communications system to the packet switched public data network PSPDN through the medium of a support node N1 designated GGSN (GGSN=Gateway GPRS Support Node). The mobile radio communications system GPRS also includes serving support nodes N2 and N3, designated SGSN (SGSN=Serving GPRS Support Node). Each of the serving support nodes N2 and N3 connects together a plurality of base station controllers BSC1 and BSC2. Each respective base station controller BSC1 and BSC2 controls one or more base transceivers BTS, B1–B3. Each base transceiver BTS is responsible for radio communication with mobile stations MS1–MS5 within at least one cell C1–C3. For instance, the base station B2 communicates with the mobile stations MS2 and MS3 in the cell C2. A base station controller BSC1 including base stations B1–B3 connected thereto is designated base station system BSS and it is through the base station system BSS that the mobile stations MS1–MS5 communicate data via the general packet radio service GPRS.

Figure 2:
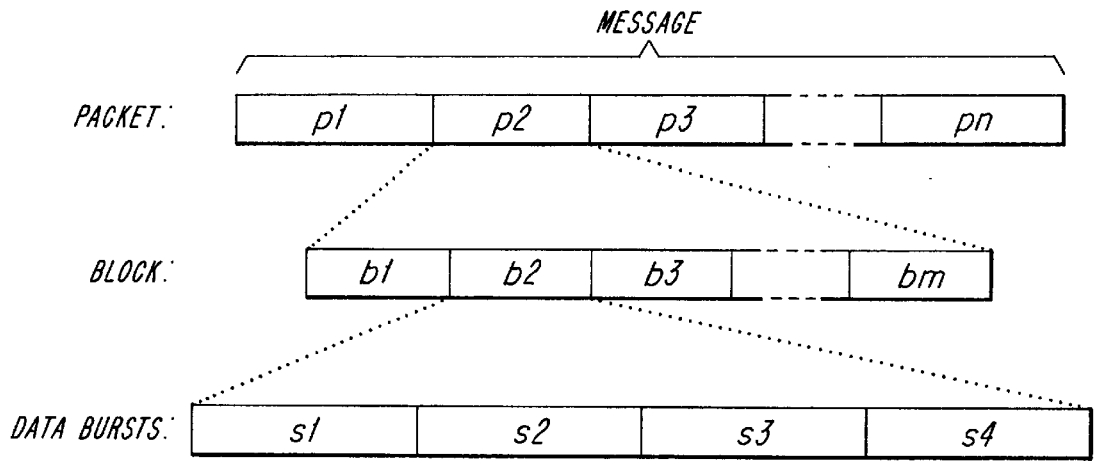
FIG. 2 illustrates a known method of dividing a message into packets, blocks and data bursts.

Prior to the transmission of data messages switched between the radio communications system and a mobile station MS, the messages are divided into one or more packets whose lengths may vary from case to case, among other things in accordance with the load on the transmission network at that moment in time. FIG. 2 illustrates the division of a message into packets p1–pn. FIG. 2 also shows the division of each packet into blocks b1–bm, each block including a specific number of information bits, e.g. 240 bits. If information space is left in the last block bm when dividing the blocks, this space is filled with dummy bits. In the physical transmission of data between the base station and the mobile station, each block is divided into four data bursts s1–s4 of equal size and each containing sixty information bits, for instance. When the radio communications system is a TDMA system, the data bursts can be transmitted bit-interleaved in four consecutive time slots on a time divided channel. Since the blocks are the smallest data units that are transmitted via the radio interface, it is necessary to allocate four new time slots on a time divided channel when re-transmitting an erroneously transmitted block.

However, the aforesaid two or more channels can be separated in the available radio spectrum in a manner different to what is the case in a TDMA system. The channels can be separated by one of the three methods described below, or by combining two or more of these methods, as illustrated respectively in FIGS. 3, 4 and 5. The available radio spectrum has a frequency spread f, a time spread t and a spread in a dimension c, which is characterized by coding information signals in a particular manner.

Figure 3:
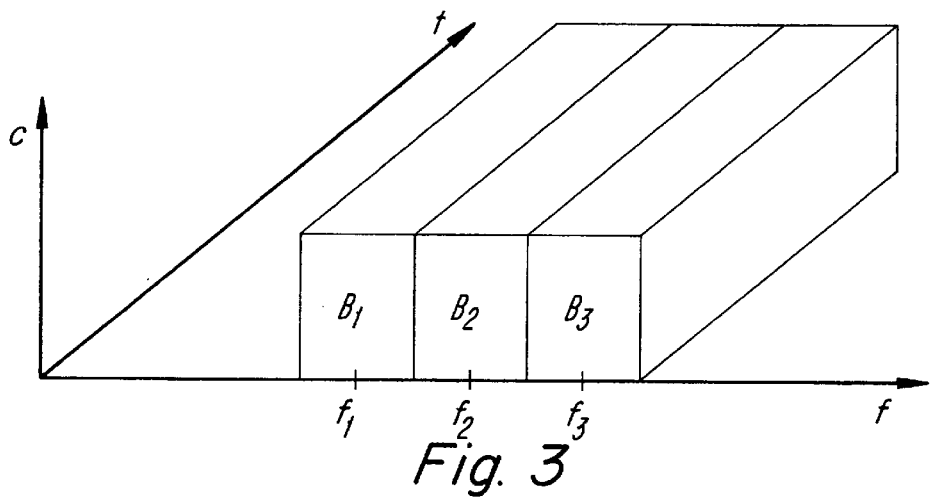
FIG. 3 illustrates a known method of dividing the radio spectrum into different frequencies (FDMA)

The available radio spectrum can be frequency divided in the manner shown in FIG. 3. In this division, different channels are separated by allocating to each channel a specific frequency space $B_1$, $B_2$ and $B_3$ around a respective carrier frequency $f_1$, $f_2$ and $f_3$ which is unique for each channel. In an FDMA system (Frequency Division Multiple Access system), such as a Nordic mobile telephone (NMT) system, the radio spectrum is divided in accordance with the aforesaid principle, wherein information signals from different channels are modulated on different carrier frequencies $f_1$–$f_3$.

Figure 4:
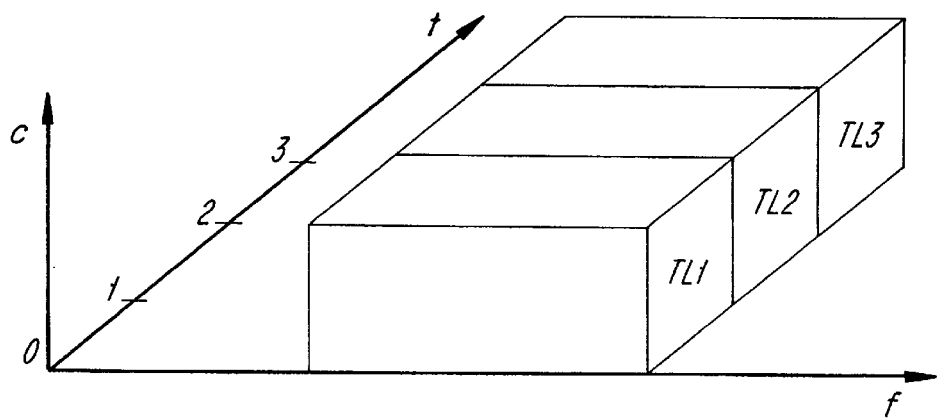
FIG. 4 illustrates a known method of dividing the radio spectrum into different time slots (TDMA)

FIG. 4 illustrates an alternative division of the radio spectrum, according to which a specific channel is characterized by a specific time slot TL1, TL2 or TL3. In this case, a first channel TL1 is comprised of the time space in a time frame between the time t=0 and t=1, a second channel TL2 is comprised of the time space between the time t=1 and t=2, and a third channel TL3 is comprised of the time space between the time t=2 and t=3. After channel TL3, channel TL1 is repeated in the next frame. The TDMA system constitutes an example of this type of radio spectrum division. GSM represents a combination of the radio spectrum division described in FIGS. 3 and 4, since a given channel in GSM is characterized both by a specific time slot and a special carrier frequency.

Figure 5:
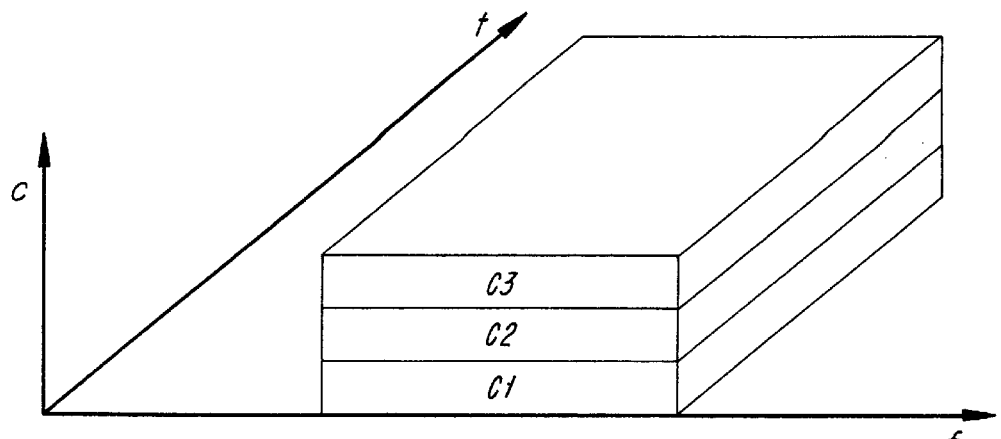
FIG. 5 illustrates a known method of dividing the radio spectrum with the aid of spread codes (CDMA)

FIG. 5 illustrates another alternative division of the radio spectrum. In this case, all channels constantly utilize the available spectrum. Thus, the channels are neither separated in time nor in frequency, but by a spreading sequence C1, C2 or C3 which is unique for each channel. In modulation, a digital information signal corresponding to a given channel is multiplied, spread, with a spreading sequence unique to said channel. In demodulation, the modulated signal is multiplied by the same spreading sequence as that used in modulation and the original signal is recreated. In the CDMA system (Code Division Multiple Access system), such as a system according to the American standard IS-95, the radio spectrum is divided in accordance with this principle.

The invention will be described in the following with reference to a TDMA system, such as a GSM system, for instance. However, it will be understood that the invention can be applied to both FDMA and CDMA systems either as combinations of the systems or combinations of said systems and the TDMA system.

Figure 6:
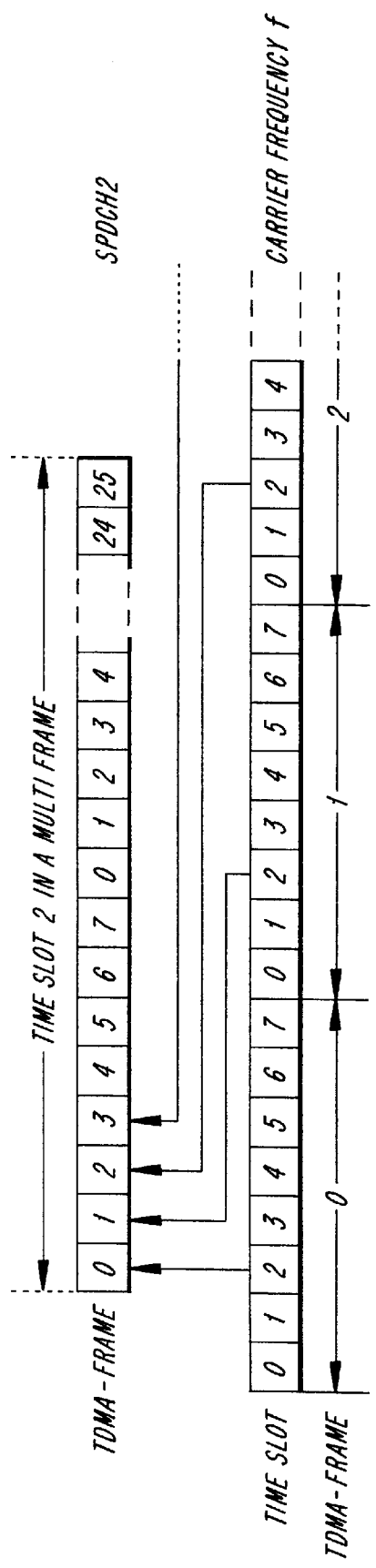
FIG. 6 illustrates a known method of defining a specific channel in a time-divided system, such as time slots on a given frequency.

FIG. 6 illustrates the manner in which a specific channel in a TDMA system is defined as time slots on a given frequency in a manner known per se. In GSM, a so-called TDMA frame is comprised of eight time slots numbered from zero to seven. These time slots form eight so-called physical channels. For instance, twenty-six TDMA frames, numbered from zero to twenty-five, together form a multi-frame. Multi-frames are used in GSM as carriers of the so-called logic channels, for instance the packet data channels. One such logic channel is comprised of a specific time slot in each TDMA frame on a separate carrier frequency. For instance, the packet data channel SPDCH2 may be comprised of time slot 2 on the carrier frequency f. The Figure illustrates the manner in which time slot 2 in a multi-frame corresponding to a packet data channel SPDCH2 is created from TDMA frame 0, 1 and 2 respectively on the carrier frequency f.

Figure 7:
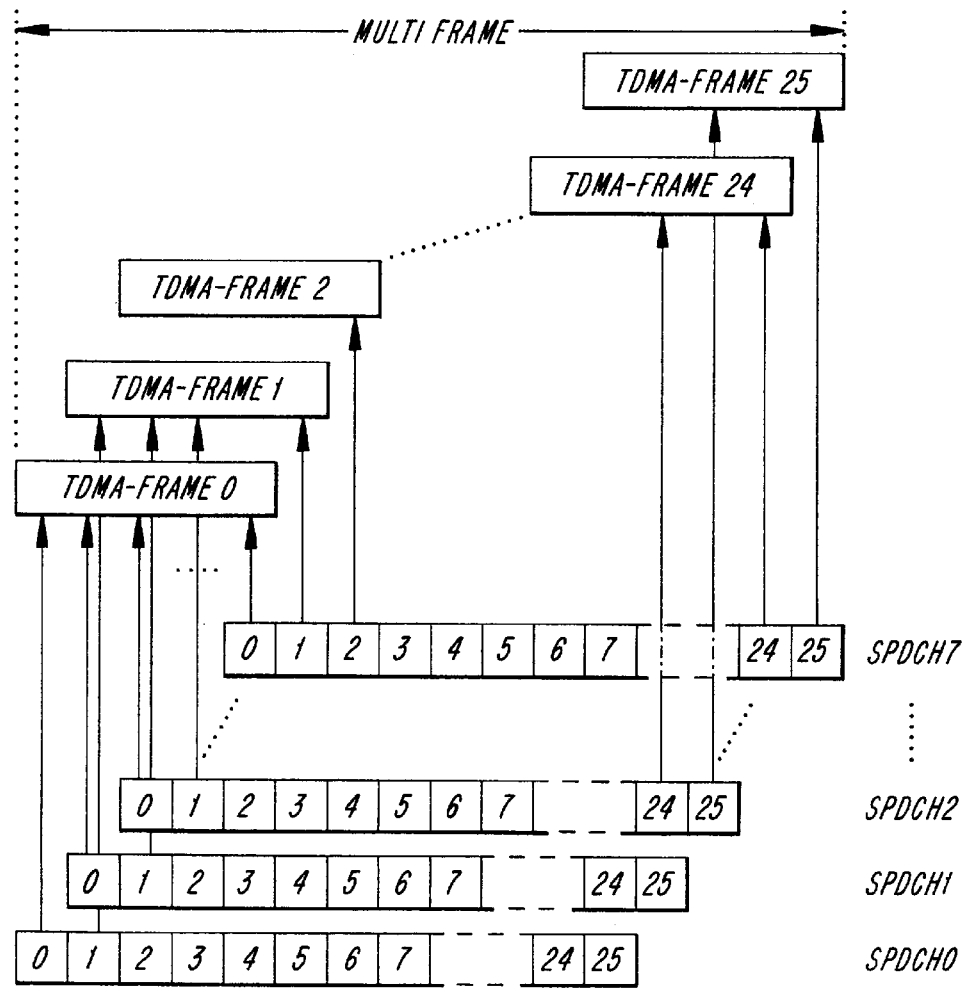
FIG. 7 illustrates how channels in a time-divided radio communications system are related to TDMA frame numbers in a known manner.

FIG. 7 illustrates how the available channels on a given carrier frequency in a TDMA system are related to TDMA frame numbers in a known manner. Each TDMA frame in a multi-frame includes information from all channels on a specific carrier frequency. For instance, TDMA frame 0 contains information from all channels SPDCH0–SPDCH7. Correspondingly, TDMA frame 1 contains information from all channels SPDCH0–SPDCH7, as illustrated in FIG. 7. Remaining TDMA frames in the multi-frame are filled in an analogous manner. When TDMA frame 25 has finally been filled with information from all channels SPDCH0–SPDCH7, TDMA frame 0 is commenced in the next following multi-frame and the same procedure is repeated for this multi-frame.

Figure 8:
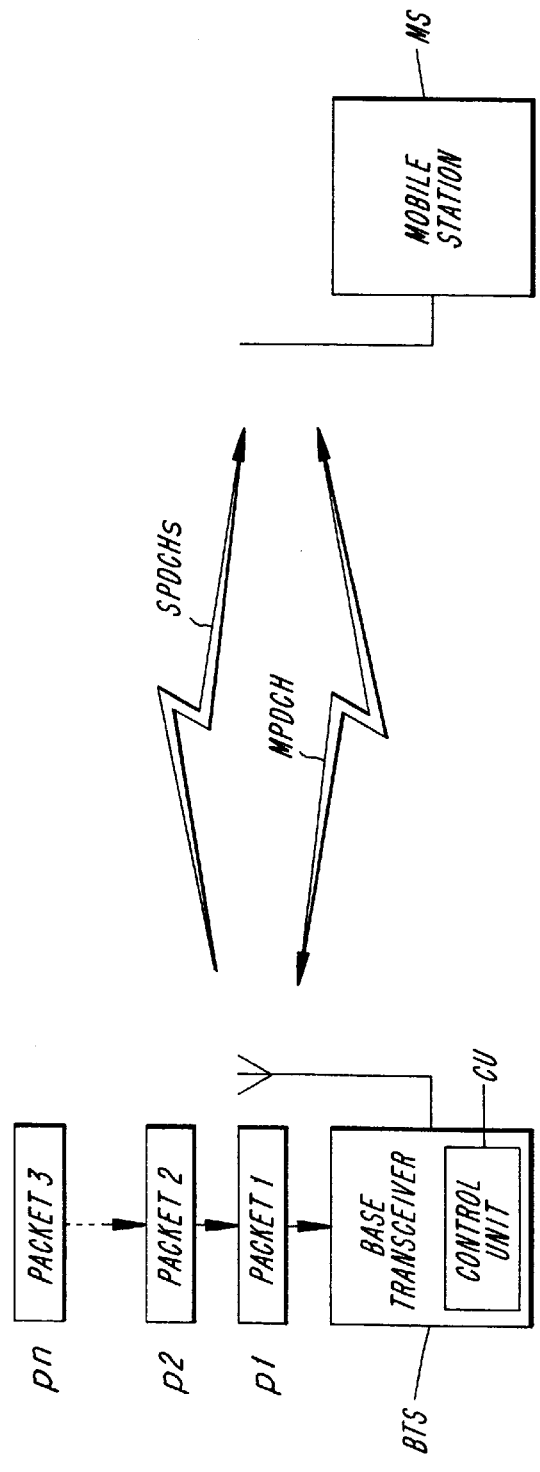
FIG. 8 illustrates generally the manner in which a primary station in the radio communications system according to FIG. 1 transmits a message to a secondary station in the same system.

FIG. 8 provides a general picture of how data is transmitted from a primary station BTS to a secondary station MS via time-divided radio channels in a known manner. In this example, it is assumed that the primary station is a base transceiver BTS, although the station may equally as well be comprised of other units in the base station system BSS, such as a base station controller. It is also assumed in the illustrated case that the secondary station is a mobile station MS. However, the secondary station may equally as well be any station capable of communicating packet data via time-divided radio channels. Data transmission is effected via time-divided slave packet data channels SPDCH on which the information stream is controlled by a specific control and return channel MPDCH hereinafter referred to as a Master Packet Data CHannel. Information consisting of the data messages is divided in the base transceiver into packets p1–pn, which are then transmitted to the mobile station as blocks, via two or more time-divided slave packet data channels SPDCH. The mobile station MS reveals the result of the transmission via the master packet data channel MPDCH, or via an arbitrary slave packet data channel SPDCH, i.e. discloses whether or not the transmission has taken place correctly. A slave packet data channel SPDCH is used primarily to reveal the result of the transmission. This is because all utilized slave packet data channels SPDCH normally lie on one and the same carrier frequency and the master packet data channel MPDCH normally lies on another carrier frequency. This means that it is unnecessary for the mobile station to change carrier frequency from the carrier frequency used in the preceding reception when one of the slave packet data channels SPDCH is used to disclose the result of the transmission instead of the master packet data channel MPDCH. Since this minimizes the number of frequency switches, the total transmission time is also shortened.

When the mobile station MS indicates to the base transceiver station BTS that a specific block has been transmitted erroneously, this block is re-transmitted on an appropriate slave packet data channel SPDCH. The slave packet data channel SPDCH that is appropriate for use to re-transmit the block is decided by the proposed control unit CU in the base transceiver station BTS.

Figure 9A:
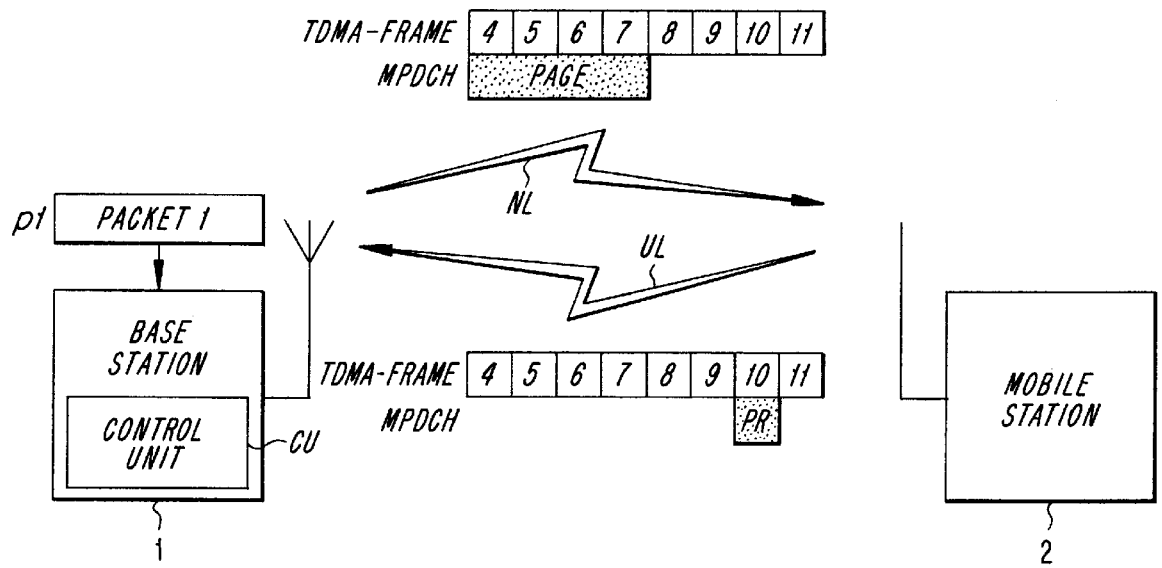
FIGS. 9a–d illustrate the signalling procedure prior to and during the transmission of a message from a primary station to a given secondary station, in accordance with the inventive method.

FIGS. 9a–9d are intended to illustrate the inventive method in signalling and message-transmitting procedures, wherein data p1, consisting of blocks b1–b5, is transmitted from a base station 1 to a mobile station 2. FIG. 9a illustrates how the base station 1 first localizes the mobile station 2, by sending to the mobile station 2 an alert message, Page, on the downlink NL of a master packet data channel MPDCH. By downlink NL is meant the transmission direction of a given duplex channel from a base station to a mobile station. Correspondingly, by uplink UL is meant the transmission direction of a given duplex channel to a base station from a mobile station. In the illustrated example, the alert message Page is sent in TDMA frames 4–7. The mobile station 2 then sends a page response PR in TDMA frame 10, via the uplink UL of the master packet data channel MPDCH. The mobile station 2 reports that the alert message Page has been received, through the medium of the page response message PR.

Figure 9B:
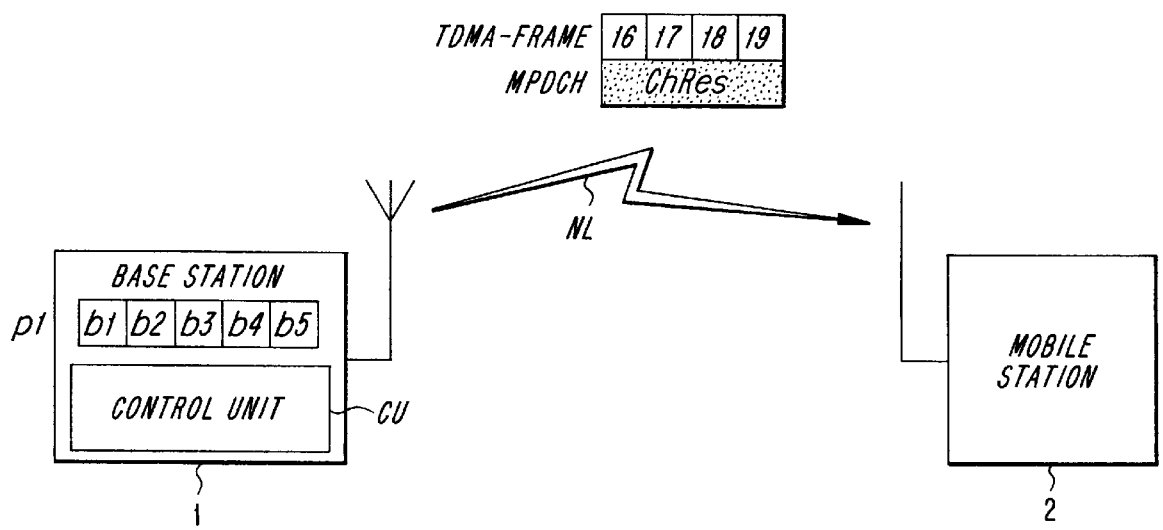

When the page response message PR is received by the base station 1, the station reserves in TDMA frames 16–19 a plurality of slave packet data channels SPDCH4–SPDCH6 for transmission of the data b1–b5, via a channel reservation message ChRes on the downlink NL of the master packet data channel MPDCH. This is illustrated in FIG. 9b.

Figure 9C:
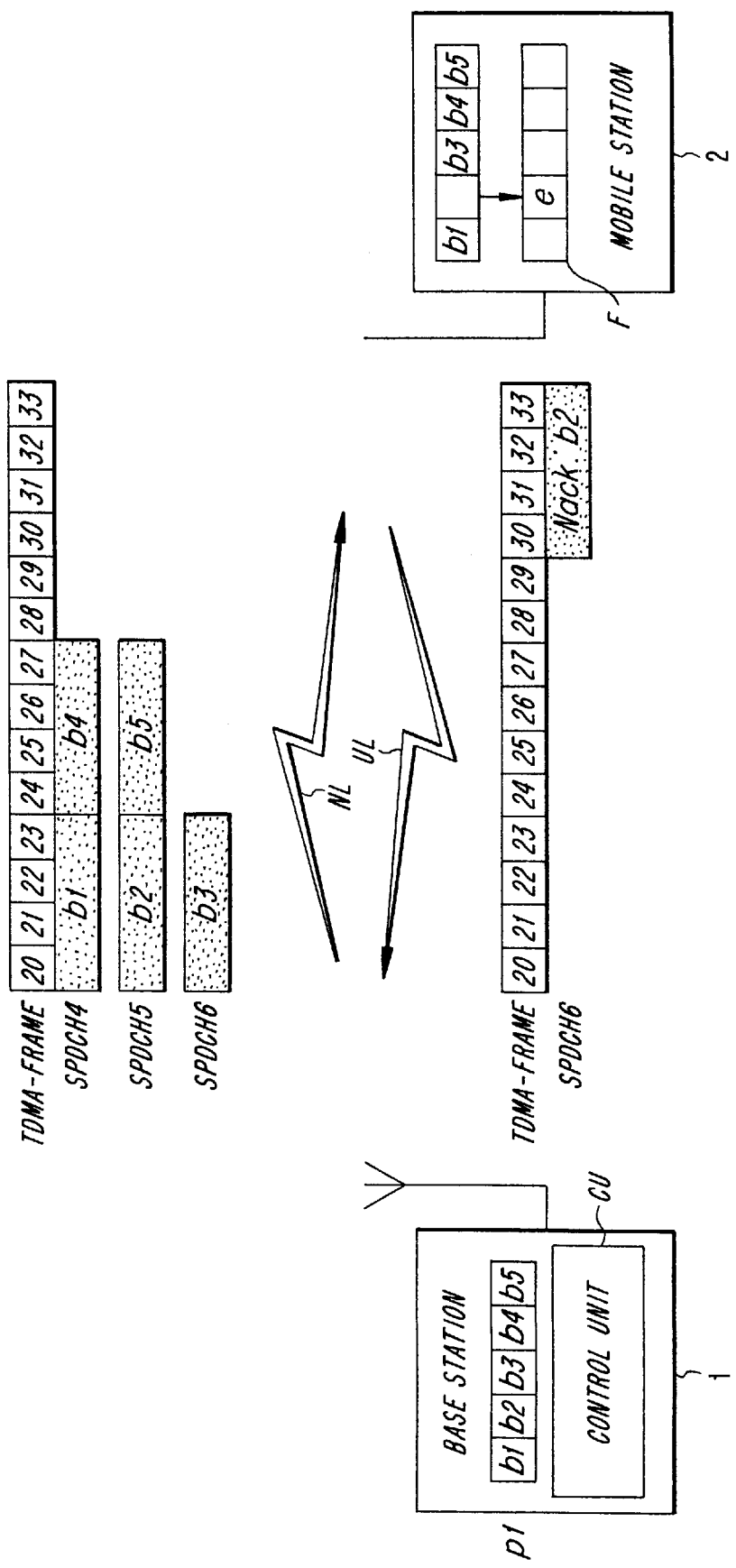

FIG. 9c illustrates the manner in which the base station 1 transfers block or blocks b1–b5 in the packet p1 in the next stage, via the reserved slave packet data channels SPDCH4, SPDCH5 and SPDCH6. The blocks are preferably distributed circularly over the allotted slave packet data channels SPDCH4–SPDCH6, so that these channels will be filled as uniformly as possible. Thus, the first block is transmitted via the first allocated slave packet data channel SPDCH4, the second block is transmitted via the second allocated slave packet data channel SPDCH5, and so on. Thus, in the illustrated case, the blocks b1 and b4 are transmitted on the slave packet data channel SPDCH4. This takes place in TDMA frames 20–27. The blocks b2 and b5 are transmitted via slave packet channel SPDCH5 in the same TDMA frames and block b3 is transmitted via slave packet data channel SPDCH6 in TDMA frames 20–23. An error occurs, however, in the second block b2 of the packet p1 in the transmission. The error is discovered in an error check carried out in the mobile station 2 and is registered in an error vector F. The discovery of the error may be effected in accordance with the following procedure, for instance. The transmitting station creates a block check sequence prior to transmitting a block. This block check sequence is created on the basis of the information contained in the block and is transmitted together with the block concerned. The receiving station determines whether or not the block has been transmitted erroneously, for instance by counting the number of bits in the received block, including its block check sequence. It is necessary for the block check sequence to include only one parity bit to discover a single bit error. When wishing to discover multi-bit errors, the block check sequence must be made longer, i.e. the sequence must include several parity bits. An account of how this is resolved is given, for instance, in a book entitled "Digital Communications" by Simon Haykin, John Wiley & Sons, Inc., New York, 1988, pp. 365–393. The mobile station 2 discloses that the second block b2 of the packet has been transmitted erroneously by a negative receipt acknowledgement, Nack (Nack=Not acknowledged) on the uplink UL of the slave packet data channel SPDCH6 in TDMA frames 30–33.

Figure 9D:
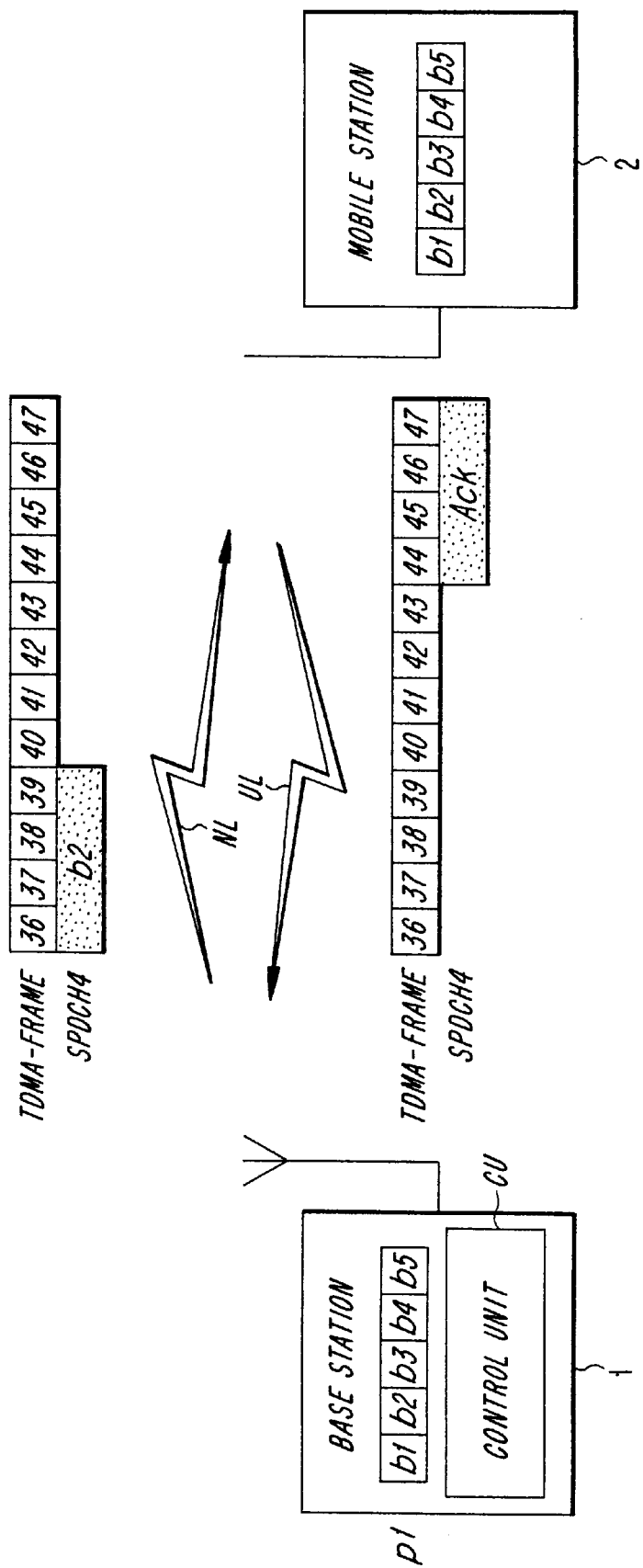

The control unit CU in the base station 1 allocates a slave packet data channel SPDCH4 for re-transmission of the erroneously transmitted block b2, in accordance with a transmission parameter created in the transmission of the packet blocks b1–b5. The transmission parameter is based on information as to which channel was used for transmitting each block, and when re-transmitting blocks that have been transmitted erroneously, the control unit CU ensures that those channels that have transmitted blocks erroneously are avoided. FIG. 9*d* illustrates how the base station 1 re-transmits the erroneously transmitted block b2 on the downlink NL of the slave packet data channel SPDCH4 in TDMA frames 36–39. This slave packet data channel is chosen by the control unit CU, because it was the first channel of the preceding channels on which no errors occurred in the previous transmission. In principle, the control unit CU may equally as well have allocated slave packet data channel SPDCH6, since no errors occurred on this channel in the previous transmission either. The mobile station 2 carries out an error check on the block b2 when the block is received. Because the error check discovers no errors, the mobile station 2 reports that the block b2 has been received correctly, by sending a positive receipt acknowledgement Ack (Ack=Acknowledged) to the base station 1 on the uplink UL of the slave packet data channel SPDCH4 in TDMA frames 44–47.

FIG. 10 illustrates a general picture of how data is transmitted from a secondary station MS to a primary transceiver station BTS in a known manner, i.e. the reverse condition to that described with reference to FIG. 8. In other respects, the same conditions as those illustrated in FIG. 8 apply. Thus, it is also assumed in this example that the primary station is a base transceiver station and that the secondary station is a mobile station MS. Data is transmitted via time-divided slave packet data channels SPDCHs on which the information stream is controlled by a specific master packet data channel MPDCH. The information, consisting of data messages, is divided in the mobile station MS into packets p1–pn, which are then transmitted as blocks to the base transceiver station BTS, via two or more time-divided slave packet data channels SPDCH. The base transceiver station BTS reveals whether or not the transmission has taken place correctly, via the master packet data channel MPDCH or via any selected slave packet data channel SPDCH.

If the base transceiver station BTS indicates that a specific block has been transmitted erroneously, this block is re-transmitted on an appropriate slave packet data channel SPDCH. The control unit CU in the base transceiver station BTS decides which slave packet data channel SPDCH is suitable for re-transmission of the block.

Figure 11A:
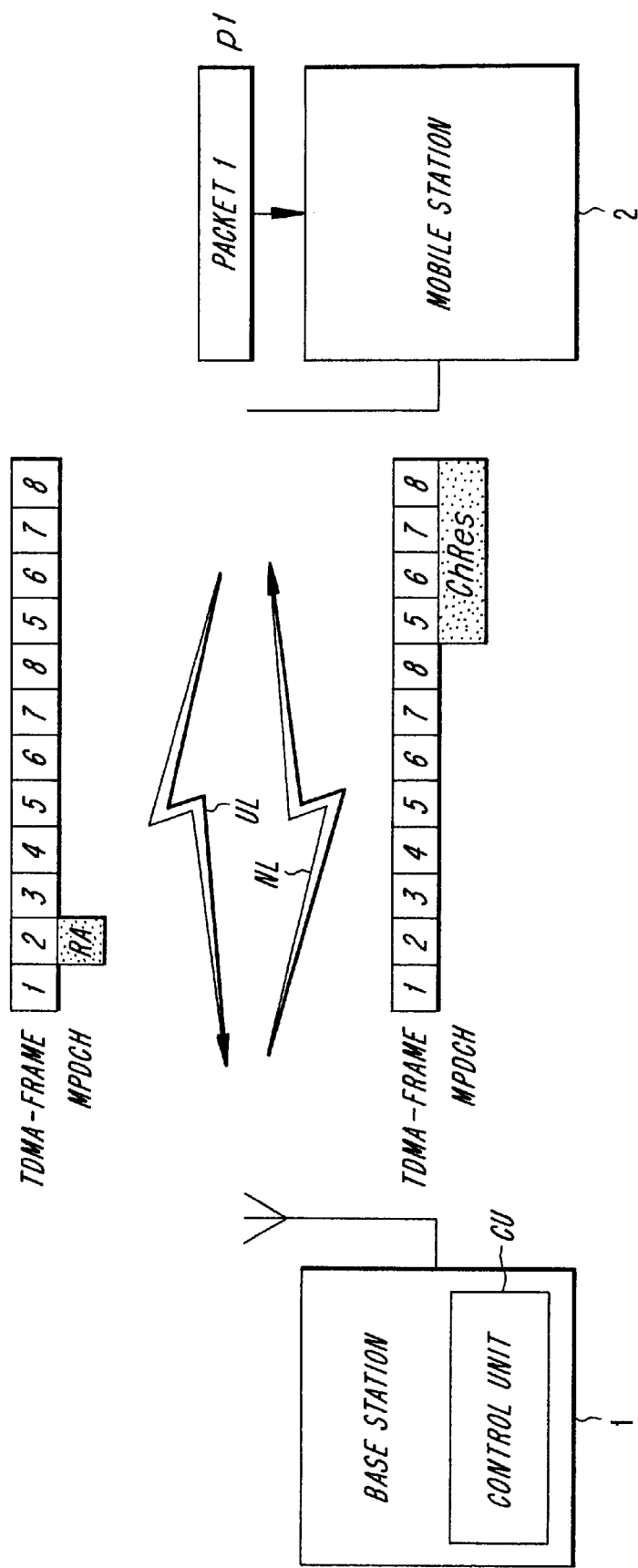
Figure 11C:
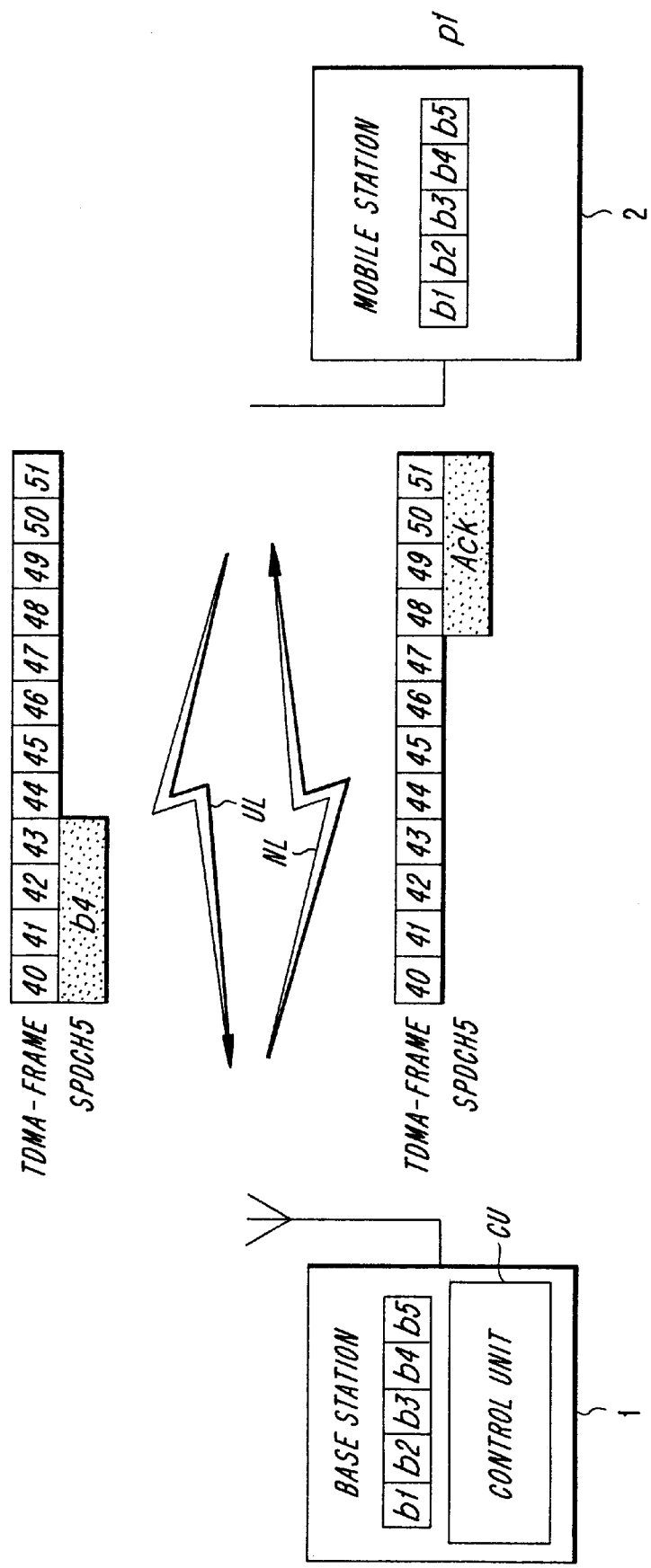

FIGS. 11*a*–11*c* are intended to illustrate the inventive method when signalling and transmitting messages, wherein data p1, consisting of blocks b1–b5, is sent from the mobile station 2 to the base station 1. FIG. 11*a* illustrates the manner in which the mobile station 2 announces a channel requirement for transmission of data p1, by sending an access request RA (RA=Random Access) to the base station 1 in TDMA frame 2, on the uplink UL of the master packet data channel MPDCH. The base station 1 meets the channel request made by the mobile station 2, by sending in TDMA frames 5–8 a channel reservation message ChRes to the mobile station 2 on the downlink NL of the master packet data channel MPDCH, in which a number of slave packet data channels SPDCH4–SPDCH6 are reserved for the transmission.

FIG. 11*b* shows how the mobile station 2 in the next stage transmits blocks b1–b5 in the packet p1 via the reserved slave packet data channels SPDCH4, SPDCH5 and SPDCH6. The blocks are preferably distributed circularly over the allocated slave packet data channels, so that these channels will be filled as uniformly as possible. Thus, the first block is transmitted via the first allocated slave packet data channel SPDCH4, the second block is transmitted via the second allocated slave packet data channel SPDCH5, and so on. Thus, in the illustrated example, the blocks b1 and b4 are transmitted on slave packet data channel SPDCH4. This takes place in TDMA frames 16–23. The blocks b2 and b5 are sent via slave packet data channel SPDCH5 in the same frames, and block b3 is sent via slave packet data channel SPDCH6 in TDMA frames 16–19. However, an error occurs in the fourth block b4 of the packet p1 in the transmission. The error is discovered in an error check carried out in the base station 1, and is registered in an error vector F. The base station 1 announces that block b4 has been transmitted erroneously, by a negative acknowledgement Nack on the downlink NL of the slave packet data channel SPDCH6 in TDMA frames 28–31. Parallel with the negative acknowledgement Nack, there is also transmitted a channel reservation ChRes through which slave packet data channel SPDCH5 is reserved for re-transmission of the erroneously transmitted block b4. The slave packet data channel SPDCH5 was chosen by the control unit CU in the base station 1, because this was the first channel of the previous transmissions on which no errors occurred. In principle, the control unit CU could equally as well have allocated slave packet data channel SPDCH6, since no errors occurred on this channel either in the previous transmission.

FIG. 11*c* illustrates how the mobile station 2 re-transmits the erroneously transmitted block b4 on the uplink UL of the slave packet data channel SPDCH5 in TDMA frames 40–43. The base station 1 carries out an error check on the block b4 when the block is received. Since the error check is unable to discover any errors, the base station 1 announces that the block b4 has been received correctly, by sending a positive acknowledgement Ack to the mobile station 2 on the downlink NL of the slave packet data channel STDCH5 in TDMA frames 48–51.

There now follows a description, with reference to the flowchart shown in FIG. 12, of how the aforesaid transmission parameter, here designated TP(SPDCHz) is created when a given data message is transmitted from a base station to a specific mobile station, i.e. in a transmission which terminates in a mobile station. Compare FIGS. 9*a*–9*d*. The processor of the control unit CU includes a variable n and a counter variable k which can be stepped from 0 to n.

In step 100, the variable n is made equal to the number of packets into which the data message has been divided, and the counter variable k is set to zero. In step 110, it is ascertained whether or not the counter variable k is equal to n; when such is the case, this means that the transmission of the data message is ready and the flowchart is ended in step 300. If the counter variable k is different from n, in other words the counter-variable k is smaller than n, the next packet in the data message is transmitted in step 120. In step 130, the control unit CU registers which respective channel, SPDCHz, of the allotted channels SPDCH1–SPDCHq was used for transmitting each individual block $b_l$, where l=1, 2, ..., m, of the m blocks included in the packet concerned. In step 140, it is ascertained whether an acknowledgement, Ack, or a negative acknowledgement, Nack, has been received, and if such is the case it is ascertained in step 150 whether or not the acknowledgement is a positive acknowledgement, Ack. Otherwise, the flowchart waits in step 140 until a receipt acknowledgement, Ack or Nack, has been obtained. If the receipt acknowledgement is a positive Ack, the counter variable k is counted up by one in step 200 and a return is made to step 110 in the flowchart for possible transmission of the next packet. In another case, i.e. when the receipt acknowledgement is negative Nack, it is ascertained in step 160 on which channels $SPDCH_{y1}$–$SPDCH_{yj}$ of the channels used in a previous transmission on which more than $n_F$ of the erroneously transmitted blocks $b_{x1}$–$b_{xi}$ have been transmitted, these blocks having been given as erroneously transmitted in the negative reception acknowledgement Nack. In step 170, it is ascertained whether or not all channels SPDCH1–SPDCHq that were used in a previous transmission have each transmitted more than a predetermined number, $n_F$, blocks erroneously. If such is the case, the blocks are re transmitted in step 190 on the channel that has transmitted the least number of blocks erroneously and on at least one further channel $SPDCH_{q+1}$ which has not been used in the previous transmission, provided that such a channel is available, and a return is made to step 150 in the flowchart and a new reception acknowledgement Ack or Nack is awaited. Otherwise, the erroneously transmitted blocks $b_{x1}$–$b_{xi}$ are re-transmitted in accordance with the inventive transmission parameter TP(SPDCHz) in step 180, on those channels of the previous channels on which the number of errors occurring in previous transmission was not greater than $n_F$. If the transmission parameter TP(SPDCHz) reveals that the number of channels available for re-transmission is greater than that required for the re-transmission in question, the blocks are re-transmitted solely on a least necessary number of the very best channels, i.e. on those channels on which the least number of blocks have been erroneously transmitted. A return is then made to step 150 and a new reception acknowledgement Ack or Nack awaited.

The number of erroneously transmitted blocks on a given channel corresponding to an acceptable channel quality for re-transmission can be shown by selection of $n_F$. Naturally, $n_F$ can be set to any positive integer value whatsoever, although $n_F$ is zero in the preferred embodiment.

Figure 13:
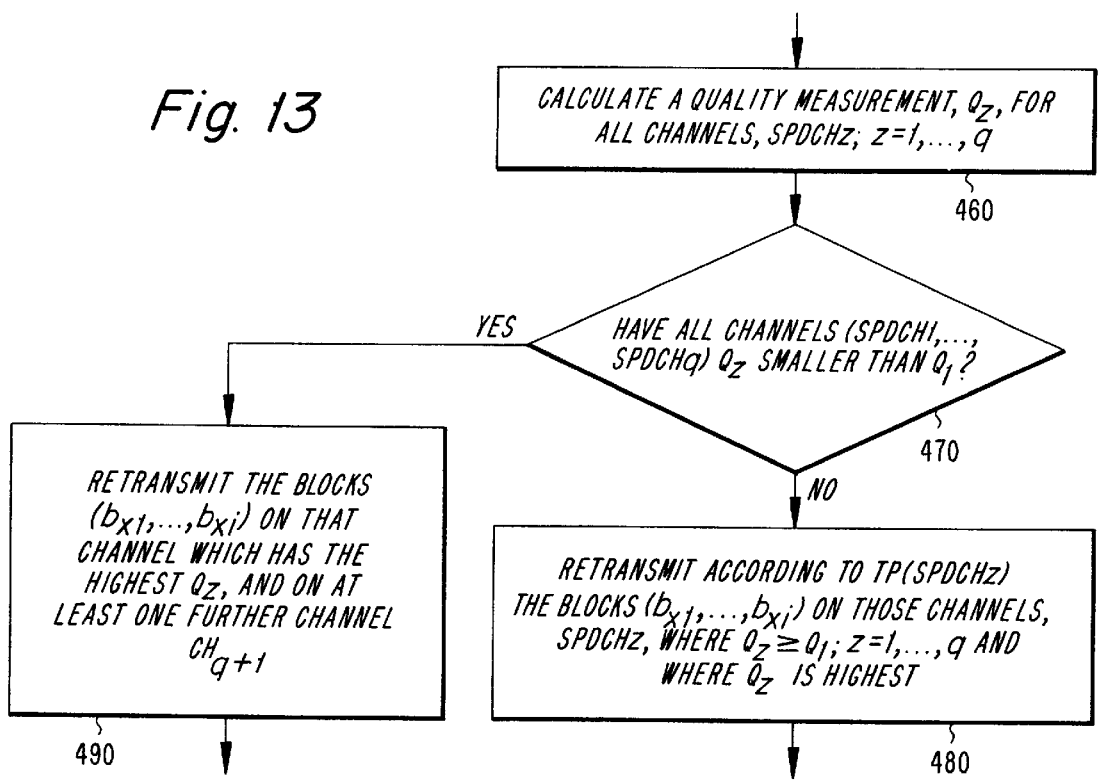
FIG. 13 is a flowchart illustrating an alternative method to the method illustrated in FIG. 12.

FIG. 13 describes alternative steps corresponding to the steps contained in the broken line square Q in FIG. 12. In step 460, there is calculated for each used channel, SPDCHz; z=1, . . . , q, a quality measurement, $Q_z$, according to $$Q_Z = \frac{N_{tot} - N_{Nack}}{N_{tot}};$$

where $n_{tot}$ represents the total number of blocks transmitted on the channel SPDCHz and where $n_{Nack}$ denotes the number of blocks transmitted erroneously on the channel SPDCHz. In step 470, a check is made to ascertain whether or not all of the $Q_z$ values of the used channels lie beneath a predetermined quality value $Q_1$. If such is the case, the erroneously transmitted blocks $b_{x1}$–$b_{xi}$ are retransmitted in step 490 on the channel that has the highest $Q_z$, and on at least one further channel $SPDCH_{q+1}$ which was not used in the previous transmission, provided that such a channel is available, and a return to step 150 is made in the flowchart in waiting for a new reception acknowledgement Ack or Nack. Otherwise, the erroneously transmitted blocks $b_{x1}$–$b_{xi}$ are transmitted on those channels SPDCHz whose $Q_z$ value is greater than or equal to $Q_1$, in accordance with the inventive transmission parameter TP(SPDCHz). If the transmission parameter TP(SPDCHz) reveals that more channels are available for re-transmission than are required for the re-transmission concerned, the blocks are re-transmitted solely on a smallest necessary number of the very best channels, i.e. on the channels which have the highest $Q_z$ value. A return to step 150 is then made in waiting for a new reception acknowledgement Ack or Nack.

Figure 14:
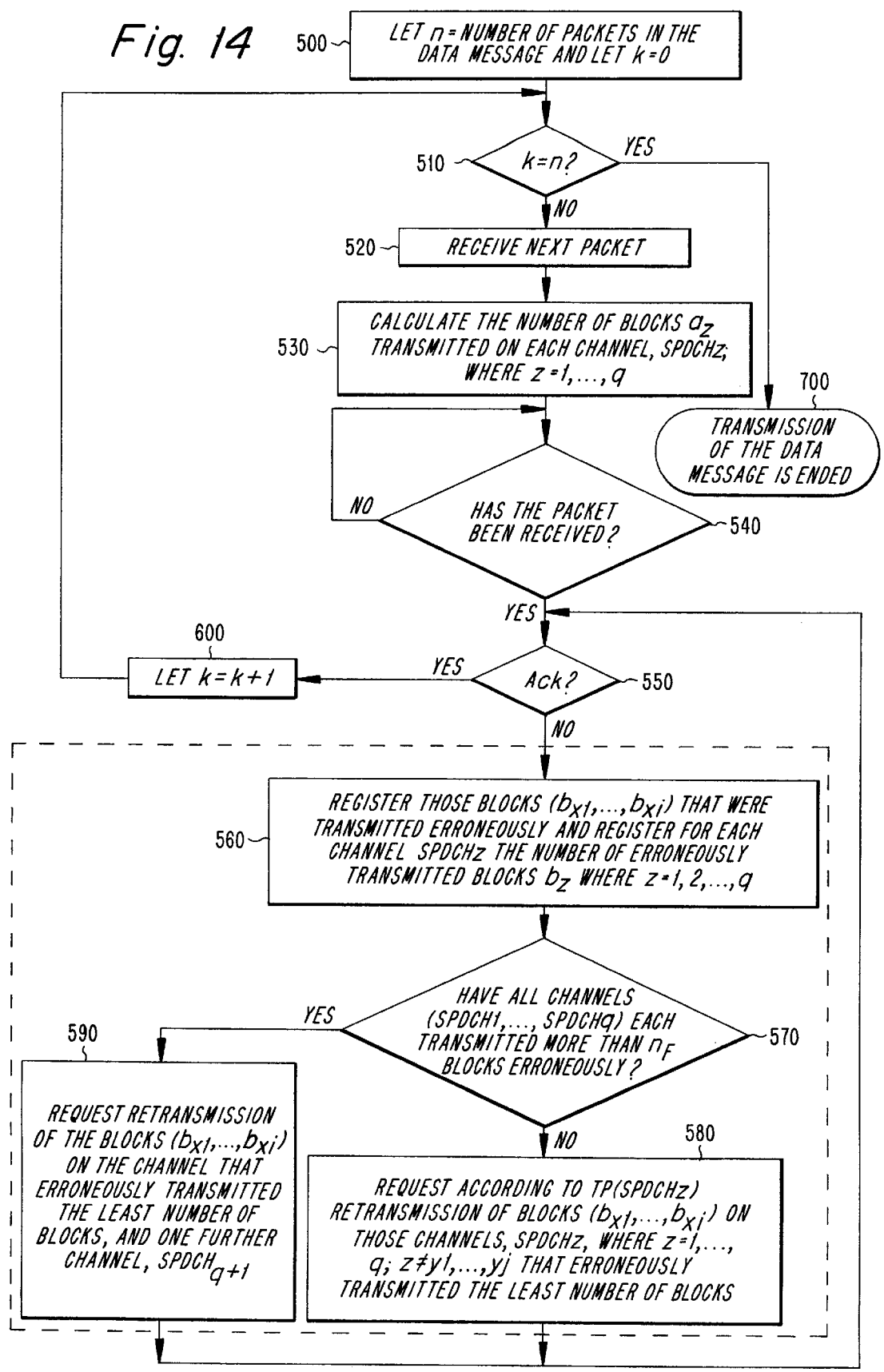
FIG. 14 is a flowchart illustrating an inventive method for application when data transmission is originated from a mobile station.

FIG. 14 is a flowchart which illustrates how the aforesaid transmission parameter TP(SPDCHz) is created in accordance with the inventive method when a given data message is transmitted from a specific mobile to a base station, i.e. in the case of a transmission which originates from a mobile station. C.f. FIGS. 11a–11c. The processor of the control unit CU includes a variable n and a counter-variable k, which can be stepped from 0 to n.

In step 500, the variable n is set to a value equal to the number of packets into which the data message has been divided, and the counter-variable k is set to zero. The base station is informed of the number of packets in the data message, via the access request from the mobile station. In step 510, it is ascertained whether or not the counter variable k is equal to n, and if such is the case then the data message transmission is finished and the flowchart terminated in step 700. When the counter variable k differs from n, i.e. is smaller than n, the next packet in the data message is received in step 520. In step 530, the control unit CU computes the number of blocks $a_z$ that will be transmitted on each of the allotted channels SPDCHz, where z=1, 2, . . . , q. In step 540, it is ascertained whether or not the packet has been received, and if the packet has been received it is then ascertained in step 550 whether or not the packet was received without error, i.e. whether or not a positive reception acknowledgement Ack has been sent to the mobile station. Otherwise, the flowchart waits in step 540 until the packet has been received. If the packet has been received with no error, the counter variable k is counted up one increment in step 600 and a return is made in the flowchart to step 510 for receiving a possible next packet in the data message. Otherwise, i.e. when the reception acknowledgement is negative Nack, those blocks $b_{x1}$–$b_{xi}$ that have been transmitted erroneously are registered in step 560, and the number of erroneously transmitted blocks $b_z$ for each channel SPDCHz, which z=1, 2, . . . , q are also registered. In step 570, it is ascertained whether or not all channels SPDCH1–SPDCHq that have been used in a previous transmission have each transmitted more than a predetermined number of blocks, $n_F$, erroneously. If such is the case, there is allocated in step 590 for re-transmission that channel which has transmitted the least number of blocks erroneously and at least one further channel $SPDCH_{q+1}$ which was not used in the previous transmission, provided that such a channel is available, and a return is made to step 550 in the flowchart in expectation of the re-transmission of the erroneously transmitted blocks $b_{x1}$–$b_{xi}$. Otherwise, re-transmission of the erroneously transmitted blocks $b_{x1}$–$b_{xi}$ is requested in step 580 in accordance with the inventive transmission parameter TP(SPDCHz) on those channels of the previous channels on which the number of errors in the previous transmission was not greater than $n_F$. If the transmission parameter TP(SPDCHz) reveals that the number of channels available for re-transmission is greater than that required for the re-transmission concerned, only a least necessary number of the very best channels are allocated, i.e. those channels which have transmitted the smallest number of blocks erroneously. The flowchart then returns to step 550 and waits for the re-transmission of the erroneously transmitted blocks $b_{x1}$–$b_{xi}$.

The number of erroneously transmitted blocks on a given channel corresponding to acceptable channel quality for transmission is shown by selection of $n_F$. Naturally, $n_F$ can be set to any positive integer value whatsoever, although $n_F$ is zero in the preferred embodiment.

Figure 15:
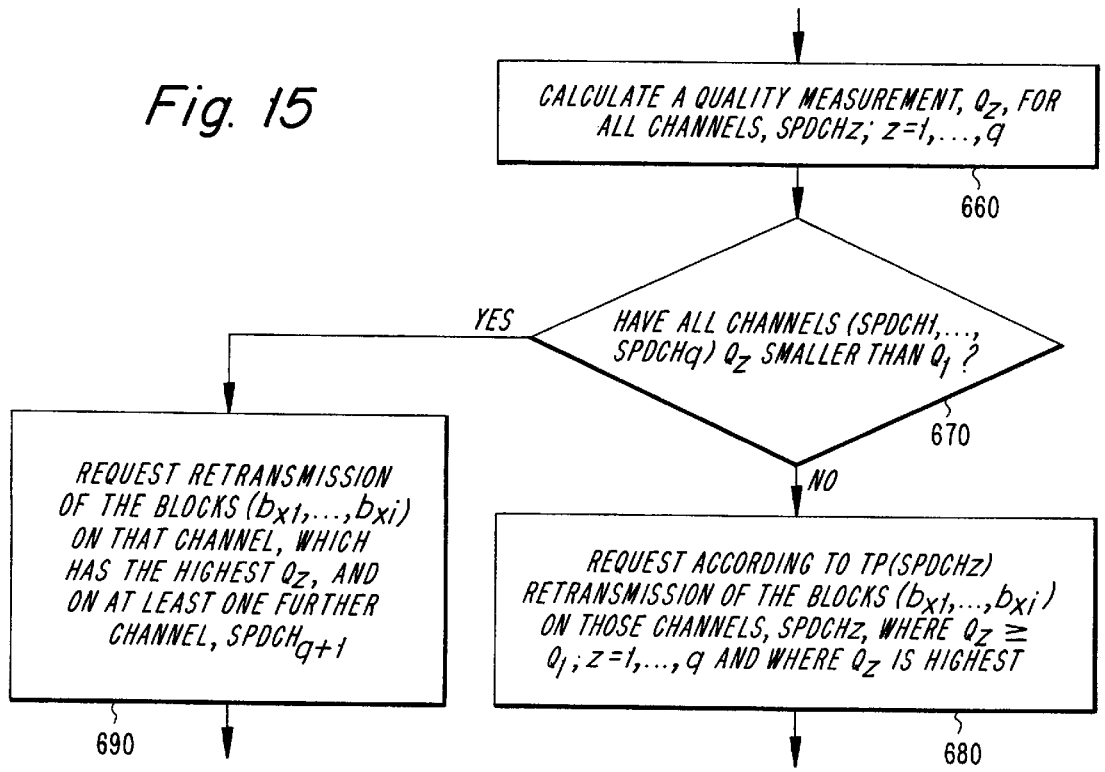
FIG. 15 is a flowchart illustrating an alternative method to the method illustrated in FIG. 14.

FIG. 15 describes alternative steps corresponding to the steps within the broken line square Q in FIG. 14. In step 660, there is calculated for each used channel, SPDCHz; z=1, . . . , q, a quality measurement, $Q_z$, in accordance with $$Q_Z = \frac{N_{tot} - N_{Nack}}{N_{tot}};$$

where $n_{tot}$ represents the total number of blocks that have been transmitted on channel SPDCHz, and where $n_{Nack}$ shows the number of blocks transmitted erroneously on the channel SPDCHz. In step 670, it is ascertained whether or not the $Q_z$ value of all used channels lies beneath a predetermined quality value $Q_1$. If such is the case, a request is made in step 690 for the re-transmission of those erroneously transmitted blocks $b_{x1}$–$b_{xi}$ on that channel which has the highest $Q_z$, and on at least on one further channel SPDCH$_{q+1}$ which was not used in the previous transmission, provided that such a channel is available, and a return is made to step 550 while awaiting the re-transmission of the erroneously transmitted blocks $b_{x1}$–$b_{xi}$. Otherwise, it is requested in step 680 that the blocks $b_{x1}$–$b_{xi}$ are transmitted on those channels SPDCHz whose $Q_z$ value is greater than or equal to $Q_1$, in accordance with the inventive transmission parameter TP(SPDCHz). If the transmission parameter TP(SPDCHz) discloses that the number of channels available for re-transmission is greater than that required for the re-transmission concerned, only the least necessary number of the very best channels are allocated, i.e. those channels that have the highest $Q_z$ value. The flowchart then returns to step 550 and waits for re-transmission of the erroneously transmitted blocks $b_{x1}$–$b_{xi}$.

Figure 16:
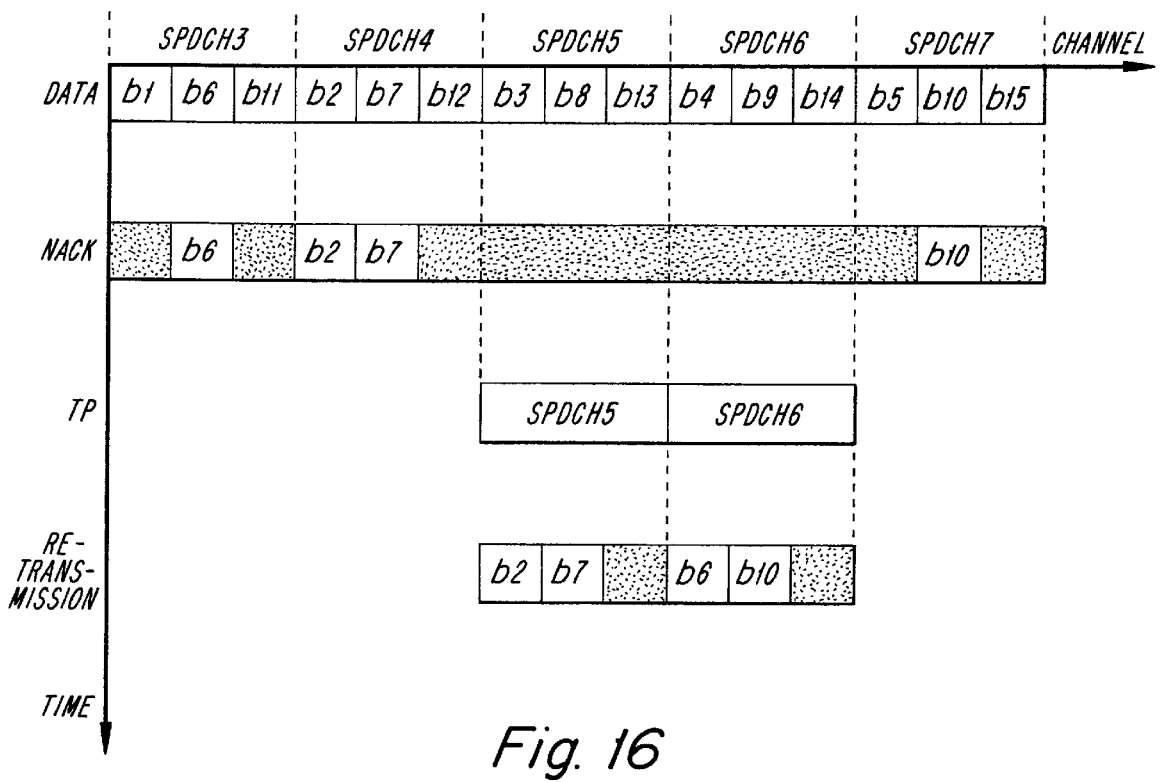
FIG. 16 illustrates an example of creating the inventive transmission parameter.

FIG. 16 illustrates an example of a result that can be obtained when the method according to the flowchart in FIG. 12 is run through and when the parameter $n_F$ is set to zero. The diagram in FIG. 16 shows channel resources along the horizontal axis and illustrates the time order of different events on the vertical axis. In this example, the slave packet data channels SPDCH3–SPDCH7 are allocated for transmission of the blocks b1–b15. The blocks are distributed circularly over the allocated slave packet data channels SPDCH3–SPDCH7. Thus, the first block b1 is transmitted via the first allocated slave packet data channel SPDCH3, the second block b2 is transmitted via the second allocated slave packet data channel SPDCH4, and so on in accordance with FIG. 16. Errors occurred in blocks b2, b6, b7 and b10 in the transmission. These errors are detected in error checks carried out in the receiving station, which reports that these blocks have been transmitted erroneously by sending a negative acknowledgement Nack. FIG. 16 illustrates how the erroneously transmitted blocks b6; b2, b7 and b10 are related to the used slave packet data channels SPDCH3, SPDCH4 and SPDCH7 respectively. Since $n_F$ is zero, according to the transmission parameter TP, only slave packet data channel SPDCH5 and SPDCH6 can be allocated for re-transmission, since these channels are the only channels that have not transmitted blocks erroneously. The blocks are also distributed circularly over the allocated slave packet data channels in the re-transmission of said blocks, such that blocks b2 and b7 are re-transmitted via slave packet data channel SPDCH5 and blocks b6 and b10 are transmitted via slave packet data channel SPDCH6.

Figure 17:
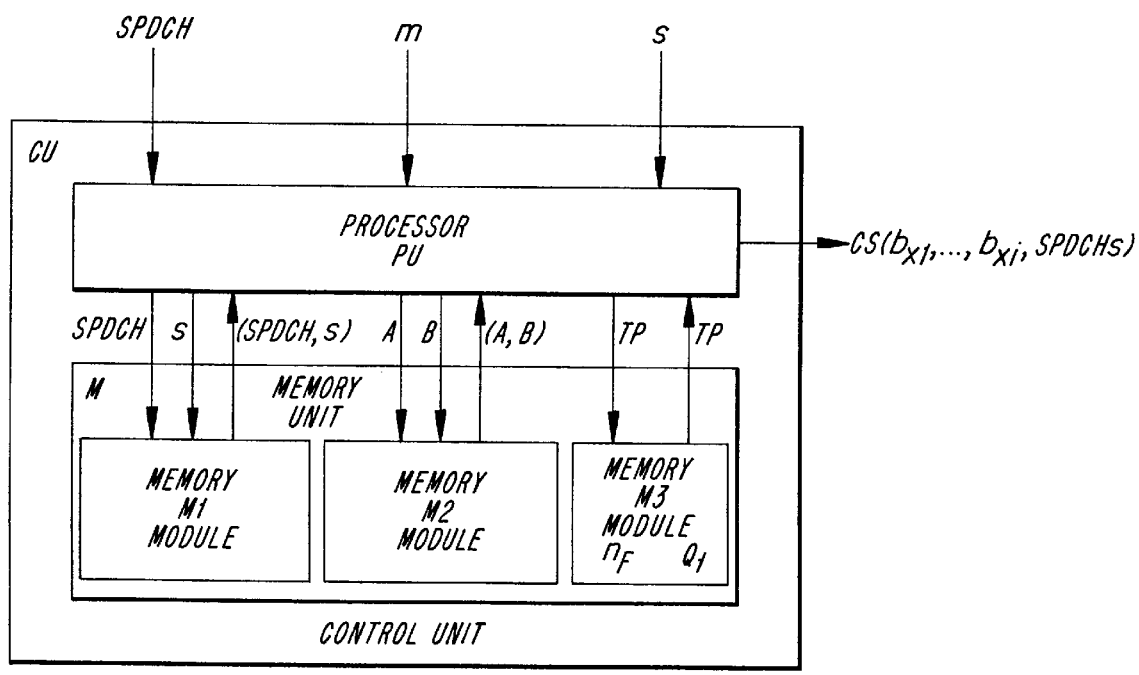
FIG. 17 illustrates a control unit for creating the proposed transmission parameter.

Shown in FIG. 17 is the inventive control unit CU which controls the steps described in the aforegoing with reference to FIGS. 12–15. The control unit CU includes a processor PU and a memory unit M. The processor PU receives information relating to used slave packet data channels SPDCH, status s for the data transmitted on these channels, and information M relating to the total number of blocks transmitted. This information is processed in the processor PU and stored in a memory module M1 in the memory unit M when the blocks are transmitted from the base station system BSS to the mobile station MS, i.e. when transmission is terminated in the mobile station MS. If the blocks are transmitted to the base station system BSS from the mobile station MS, i.e. if transmission is originated in the mobile station MS, the processed information A and B is stored in a second memory module M2 in the memory unit M instead. A third memory module M3 is used to store the proposed transmission parameter TP, which is created in the processor PU in accordance with one of the methods described in FIGS. 12–15, with the aid of the information taken from memory module M1 or M2. The transmission parameter TP includes a list of those slave packet data channels SPDCHs which should be used for any re-transmission and is created subsequent to the control unit CU having received a reception acknowledgement Ack, Nack, from the receiving station. The reception acknowledgement is represented by a status vector s in the illustrated case, this status vector denoting the status of each transmitted block, i.e. whether a given block has been transmitted correctly, Ack, or erroneously, Nack. Also stored in the memory module M3 are the aforesaid quality parameters $n_F$ and $Q_1$. $n_F$ may be chosen as zero and $Q_z$ set to 0.9, although it is evident that $n_F$ may be any positive integer and $Q_z$ may take any value whatsoever between zero and one. A control signal CS indicates the slave packet data channels SPDCHs that shall be used to transmit the erroneously transmitted blocks $b_{x1}$–$b_{xi}$. The control signal CS is produced by the processor PU on the basis of the created transmission parameter TP. Only the very best slave packet data channel of those channels which have sufficiently good transmission quality according to the transmission parameter TP are primarily used for re-transmission.

Figure 18:
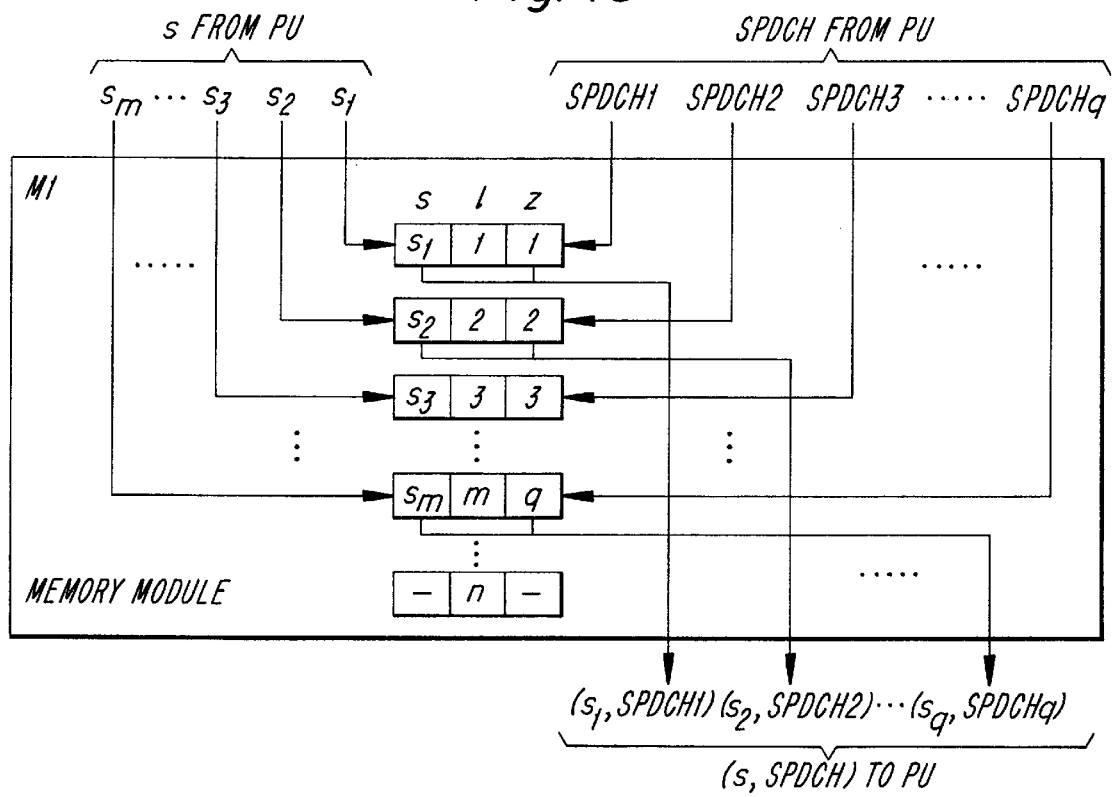
FIG. 18 illustrates a memory unit for storing channel numbers relating to block numbers in accordance with the inventive method.

FIG. 18 illustrates how information z relating to used slave packet data channels SPDCH1–SPDCHq is stored in the memory module M1 in FIG. 17 for each transmitted block l, where l=1, 2, . . . , m in data transmission that terminates in the mobile station MS. A vector SPDCH delivered from a transmitter unit via the processor PU, includes information as to which slave packet data channels SPDCH1–SPDCHq were used for the transmission. Transmission status, i.e. information relating to the result of the transmission of each individual block, is delivered in the form of a vector s from the processor PU. The vector s includes status information $s_1$–$s_m$ for each transmitted block. An output signal in the form of a matrix (s, SPDCH) relates to information concerning transmission status $s_1$–$s_m$ to the used slave packet data channels SPDCH1–SPDCHq. The matrix (s, SPDCH) constitutes a basis for the aforesaid transmission vector TB and is created in the following manner. Channel number z, where z=1, 2, . . . , q, is stored for each transmitted block number l, where l=1, 2, . . . , m, in respective memory cells, as shown in FIG. 18. In column l, n denotes the highest number of blocks that can be included in a packet in the packet switching radio communications system. When a reception acknowledgement in the form of vector s has been received for the transmission concerned, there is stored in respective memory cells s, as shown in FIG. 18, for each block l, where l=1, 2, ..., m, a corresponding status $s_i$, where i=1, 2, ..., m; $s_i$=0 with respect to Ack and $s_i$=1 with respect to Nack. The matrix (s, SPDCH) is obtained by reading status $s_1$–$s_n$ and slave packet data channels SPDCH1–SPDCHq for each block l, where l=1, 2, ..., m. The processor PU then creates the transmission vector TP by comparing information relating to status $s_i$ with one of the predetermined quality parameters $n_F$ or $Q_1$ for each slave packet data channel SPDCH1–SPDCHq. The processor PU can either ascertain for each slave packet data channel whether the sum $\Sigma s_z$ of status $s_z$ is greater than or equal to a first predetermined value $n_F$ stored in the memory module M3, or the processor PU can calculate for each slave packet data channel SPDCHz a value, $Q_z$, according to $$Q_Z = Q_2 = \frac{n_z - \sum s_z}{n_z};$$

where $n_z$ denotes the number of status elements for slave packet data channel SPDCHz and $\Sigma s_z$ constitutes said sum of status $s_z$, and ascertain whether $Q_z$ is greater than or equal to a second predetermined value $Q_1$, which is also stored in the memory module M3.

Figure 19:
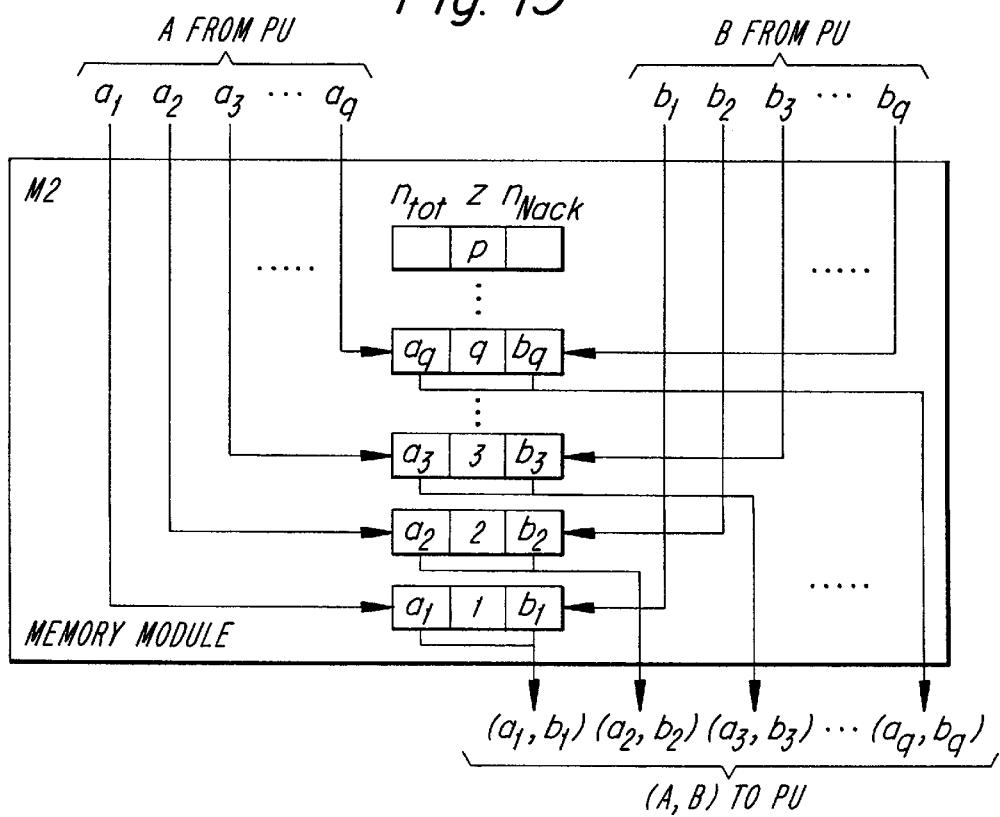
FIG. 19 illustrates a memory unit for storing a number of erroneous blocks related to channel numbers in accordance with the inventive method.

FIG. 19 illustrates the manner in which the memory module M2 stores information relating to the total number of transmitted blocks $n_{tot}$ and the number of erroneously transmitted blocks $n_{Nack}$ for each of the used slave packet data channels SPDCH1–SPDCHq in data transmission that originates from the mobile station MS. A vector A created in the processor PU includes information $a_1$–$a_q$ relating to the number of blocks $a_z$ transmitted on respective slaved packet data channels SPDCHz of the allocated slave packet data channels SPDCH1–SPDCHq. A vector B includes information relating to the result of the transmission and revealing the number of blocks $b_z$ transmitted erroneously on respective slave packet data channels SPDCHz. The vector B is also created in the processor PU. An output signal in the form of a matrix (A, B) relates to information concerning the transmission status of the used slave packet data channels SPDCH1–SPDCHq. The matrix (A, B) forms a basis for the transmission vector TP and is created in the following manner. With the aid of information relating to the total number of blocks m that shall be transmitted on the reserved slave packet data channels SPDCH1–SPDCHq, the processor PU in the control unit CU calculates how many blocks $a_z$ which will be transmitted on each slave packet data channel SPDCHz. The number of blocks m is given in the mobile station access request RA and the number of blocks $a_z$ that will be transmitted on respective allocated slave packet data channels SPDCHz can be readily calculated, since the blocks $b_l$, where l=1, 2, ..., m, are distributed circularly over the allocated slave packet data channels SPDCH1–SPDCHq, from the lowest channel number to the highest. It can be mentioned by way of example that when transmitting a packet which comprises twenty-three blocks on five slave packet data channels SPDCH1–SPDCH5, five blocks will be transmitted on each of the three slave packet data channels that have the lowest channel numbers SPDCH1–SPDCH3 and four blocks on the remaining two slave packet data channels SPDCH4 and SPDCH5. The control unit CU receives from a receiver unit information relating to status block B of the received blocks $b_l$, where l=1, 2, ..., m, and registers the number of erroneously transmitted blocks $b_z$ for each used slave packet data channel SPDCHz in the memory module M2. In column z, p represents the greatest number of slave packet data channels SPDCHs that can be allocated in the packet switching radio communications system. The numbers $a_z$ and $b_z$ are then used by the processor PU to decide whether or not a specific slave packet data channel SPDCHz is suitable for use in re-transmission of the blocks, this decision being made with the aid of one of the quality parameters $n_F$ or $Q_1$. The processor PU can either ascertain whether $b_z$ is smaller than or equal to a first predetermined value $n_F$ stored in the memory module M3, or can calculate for each channel SPDCHz a value, $Q_z$, according to $$Q_Z = \frac{a_z - b_z}{a_z}$$

and ascertain whether or not $Q_z$ is greater than or equal to a second predetermined value $Q_1$, which is also stored in the memory module M3.

Figure 20:
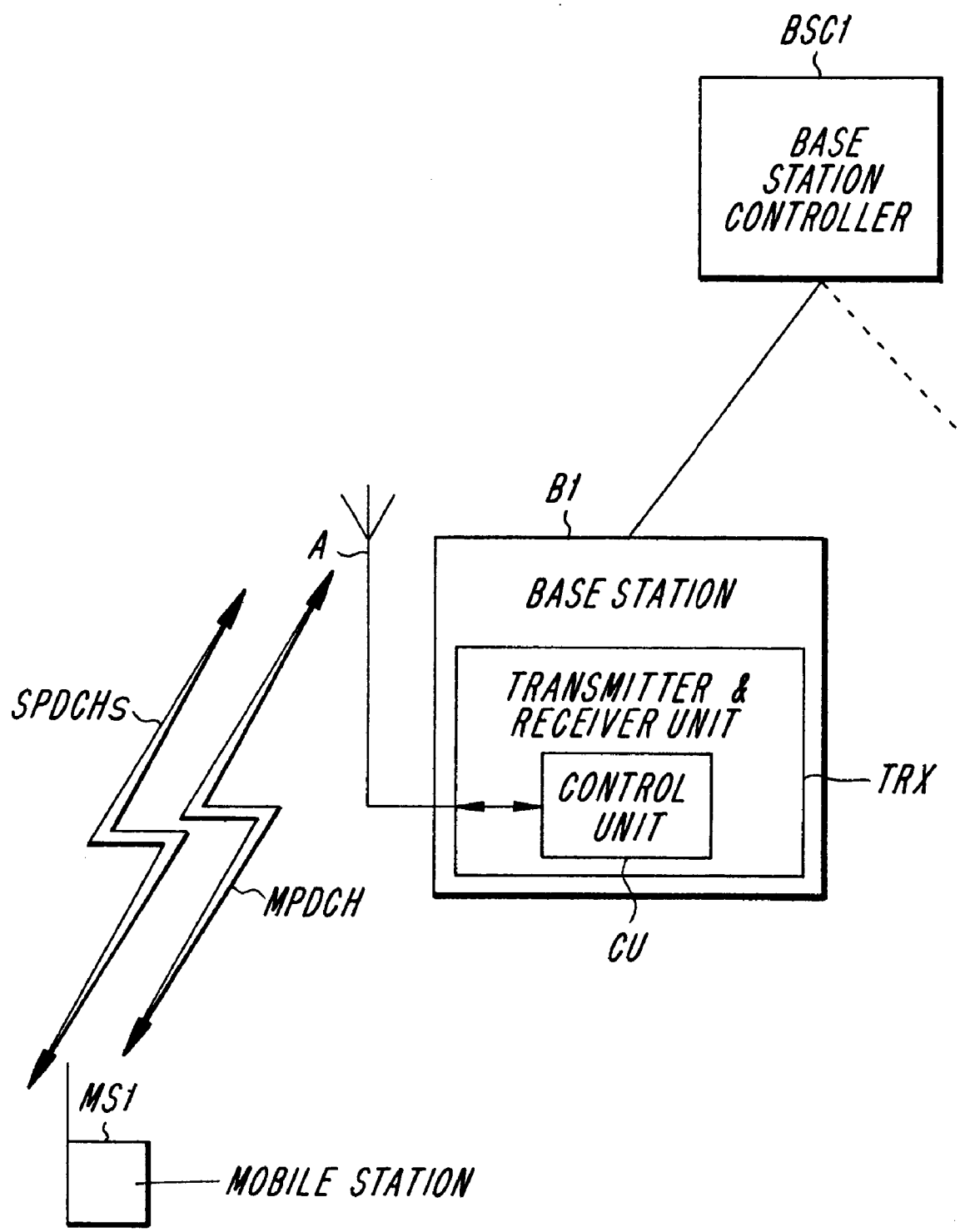
FIG. 20 illustrates the inventive control unit connected to a base station.

FIG. 20 illustrates the manner in which the inventive control unit CU is connected to remaining units in a base station B1. The base station B1 includes at least one transmitter and receiver unit TRX. The control unit CU is arranged in the transmitter and receiver unit TRX, so that all information arriving at and departing from the unit TRX will pass via the control unit CU. This enables the control unit CU to register information relating to data received in the base station B1 from a specific mobile station MS1, and controlling the slave packet data channels SPDCHs on which data is transmitted from the base station B1 to the mobile station MS1 when re-transmission terminates in the mobile station MS1. In the case of re-transmission that originates from the mobile station MS1, the control unit CU is also able to disclose, via the master packet data channel MPDCH, on which slave packet data channels SPDCHs re-transmission from the mobile station MS1 to the base station B1 shall take place.

Alternatively, the control unit CU may be arranged between the transmitter and receiver units TRX of the base station B1 and the antenna unit A, so as to provide a common resource for two or more transmitter and receiver units TRX.

Figure 21:
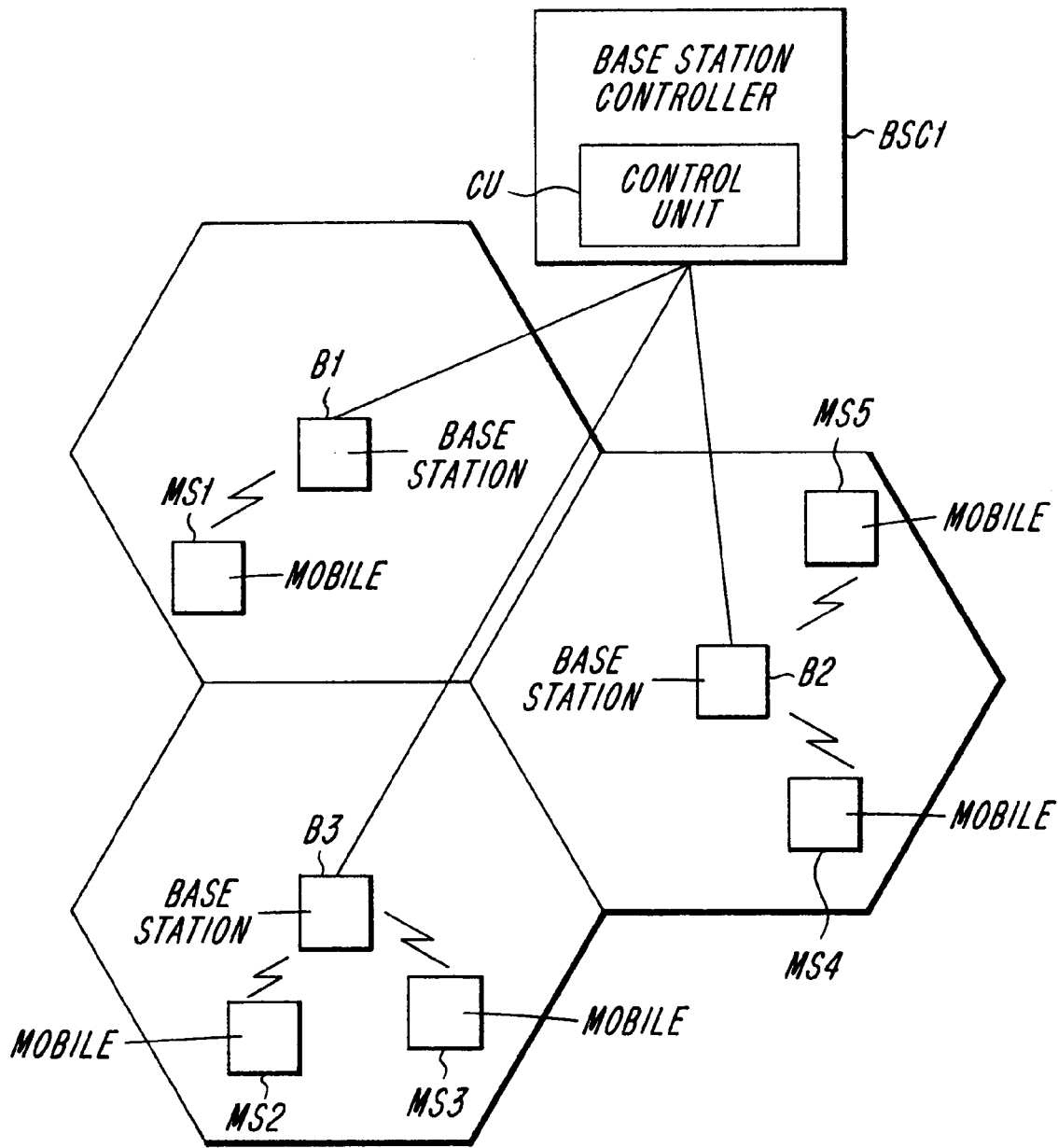
FIG. 21 illustrates the inventive control unit connected to a base station controller.

As before mentioned, the inventive control unit CU may also be connected to a base station controller BSC1. This enables the control unit CU to control channel allocation in re-transmission for a number of base stations B1–B3 that communicate data with mobile stations MS1–MS5 in a manner analogous to when the control unit is placed in a base station B1 as before described. FIG. 21 illustrates this situation.

What is claimed is:

1. A method of channel allocation in a radio communication system comprising a primary station and a secondary station adapted to communicate data over two or more channels in accordance with a protocol for the automatic re-transmission of erroneously transmitted data, the method comprising the steps of:

deriving for a given transmission a transmission parameter associated with each of the two or more channels, wherein said transmission parameter is related to channel quality; and allocating for transmission, in accordance with the transmission parameter created from said previous transmission, at least one of the preceding channels used for previously transmitting data when data is transmitted erroneously over a given channel.

2. A method according to claim 1, wherein said previous transmission of data is the nearest preceding data transmission.

3. A method according to claim 1, wherein the transmission parameter is based on information relating to which channel was used for transmitting each given data between the primary station and the secondary station.

4. A method according to claim 3, further comprising the step of allocating for transmission at maximum one channel of the previous channels use for earlier transmitted data on which the number of errors occurrent in previous data transmission was greater than a predetermined number $n_F$, when data is transmitted erroneously over a given channel.

5. A method according to claim 4, wherein $n_F=0$.

6. A method according to claim 4, wherein when each of all channels that were used in a previous transmission, transmitted data having more errors than $n_F$, allocating for re-transmission of the data at least one further channel that was not used in the previously transmission, provided that such a channel is available.

7. A method according to claim 3, further comprising the step of for each used channel, calculating a quality measurement, $Q_z$, according to $$Q_Z = \frac{N_{tot} - N_{Nack}}{N_{tot}};$$

where $N_{tot}$ represents the total number of blocks transmitted on said channel where $N_{Nack}$ denotes the number of blocks transmitted erroneously on said channel by the previous channels used for earlier data transmission for which the quality measurement, $Q_z$, is below a predetermined quality limit $Q_1$.

8. A method according to claim 7, wherein $Q_1=0.9$.

9. A method according to claim 7, further comprising the step of when the quality measurement, $Q_z$, for all channels that were used in a previous transmission is below $Q_1$, allocating for transmission at least one further channel that was not used in the previous transmission, provided that one such channel is available.

10. A method according to claim 1, wherein said channels are time divided.

11. A method according to claim 1, wherein said channels are frequency divided.

12. A method according to claim 1, wherein said channels are divided by a spreading code unique for each channel.

13. An arrangement for allocating channels in a radio communications system comprising:
a primary station and a secondary station adapted to communicate data over two or more channels in accordance with a protocol for the automatic re-transmission of erroneously transmitted data, wherein the primary station includes a control unit,
the control unit including:
means for deriving a transmission parameter relating to channel quality for each of the two or more channels; and
channel allocating means for allocating, in the event of erroneously transmitted data over a given channel, at least one of the previous channels used for earlier data transmission in accordance with the transmission parameter created from the previous transmission.

14. An arrangement according to claim 13, wherein said previous transmission is the nearest preceding data transmission.

15. An arrangement according to claim 13, wherein the transmission parameter is based on information relating to the channel that was used for transmitting each given data between the primary station and the second station.

16. An arrangement according to claim 15, wherein the control unit calculates a quality measurement, $Q_z$, according to $$Q_Z = \frac{N_{tot} - N_{Nack}}{N_{tot}};$$

for each used channel where $N_{tot}$ represents the total number of blocks that have been transmitted on said channel and where $N_{Nack}$ denotes the number of blocks transmitted erroneously on said channel in that at maximum one channel of the previous channels for earlier transmitted data for which the quality measurement, $Q_z$, is below a predetermined quality limit, $Q_1$, is allocated for retransmission.

17. An arrangement according to claim 16, wherein $Q_1=0.9$.

18. An arrangement according to claim 16, wherein when the quality measurement, $Q_z$, for all channels that were used in a previous transmission is beneath $Q_1$, the control unit allocates for re-transmission at least one further channel that was not used in the previous transmission, provided that such a channel is available.

19. An arrangement according to claim 15, wherein in the event of erroneously transmitted data over a given channel, the control unit allocates for re-transmission at maximum one channel from the previous channels used for earlier data transmission on which the number of errors in said previous transmission was greater than a predetermined number $n_F$.

20. An arrangement according to claim 19, wherein $n_F=0$.

21. An arrangement according to claim 19, wherein when all channels used in a previous transmission have each transmitted data with more errors than $n_F$, the control unit allocates for re-transmission at least one further channel that was not used in said previous transmission, provided that such a channel is available.

22. An arrangement according to claim 13, wherein the channel allocating means includes a processor and a memory unit; and the processor creates said transmission parameter for each transmission of data between the primary station and the secondary station and stores this parameter in the memory unit.

23. An arrangement according to any one of claims 13, wherein the arrangement is included in the primary station.

24. An arrangement according to claim 13, wherein the primary station is comprised of a base station system; and the secondary station is a mobile station.

25. An arrangement according to claim 13, wherein the primary station is a base station; and the secondary station is a mobile station.

26. An arrangement for channel allocation in a radio communication system comprising:
a primary station and a secondary station adapted to communicate data over two or more channels in accordance with a protocol for the automatic re-transmission of erroneously transmitted data, where the status of transmitted data is given through a reception acknowledgment, which data is divided into one or more packets, each of which comprises one or more blocks, the primary station including
a control unit for deriving for a given transmission a transmission parameter, associated with each of said two or more channels, wherein the transmission parameter is related to channel quality; the control unit including;
channel allocation means for allocating in the event of erroneously transmitted data over a given channel at least one of the previous channels for earlier transmitted data in accordance with the transmission parameter created from said previous transmission; and the transmission parameter is based on information relating to which channel that was used for the transmission of each given data between the primary station and the secondary station.

27. An arrangement according to claim 26, wherein said channel allocation means includes a processor and a memory unit; and the processor creates said transmission parameter for each transmission of data between the primary station and the secondary station and stores this parameter in the memory unit.

28. An arrangement according to claim 27, the transmission parameter is created by the processor with the aid of information relating to the previous channels for earlier transmitted data and a reception acknowledgement; and the transmission parameter contains information relating to those channels that can be used for the re-transmission of erroneously transmitted data.

29. An arrangement according to claim 27, wherein the memory unit functions to store the transmission parameter at least until a reception acknowledgement has been received informing that the entire packet in which the blocks concerned are included has been transmitted correctly.

30. An arrangement according to claim 27, wherein in the event of data being transmitted erroneously over a given channel, the channel allocation means allocates for re-transmission at maximum one channel of the previous channels used for the previous transmission of data on which the number of errors occurring in said previous transmission was greater than a predetermined number $n_F$.

31. An arrangement according to claim 30, wherein $n_F=0$.

32. An arrangement according to claim 30, wherein when each of the channels used in a previous transmission transmitted data with more errors than $n_F$, the control unit functions to allocate for re-transmission at least one further channel that was not used in the previous transmission, provided that one such channel is available.

33. An arrangement according to claim 27, wherein the channel allocation means calculates for each used channel a quality measurement, $Q_z$, according to $Q_z=$ $$= \frac{N_{tot} - N_{Nack}}{N_{tot}}$$

where $N_{tot}$ represents the total number of blocks that have been transmitted on channel and where $N_{Nack}$ denotes the number of erroneously transmitted blocks on the channel; and in that for re-transmission there is allocated at maximum one channel of the previous channels used for previous data transmission for which the quality measurement, $Q_z$, is below a predetermined quality limit, $Q_1$.

34. An arrangement according to claim 33, wherein $Q_1=0.9$.

35. An arrangement according to claim 33, wherein when the quality measurement, $Q_z$, for all channels used in a previous transmission is beneath $Q_1$, the channel allocation means allocates for re-transmission at least one further channel which was not used in the previous transmission, provided that one such channel is available.

36. A base station controller adapted to communicate data with at least one mobile station via at least one base station and over two or more channels in accordance with a protocol for the automatic re-transmission of erroneously transmitted data, wherein the base station controller includes a control unit for creating a transmission parameter that is derived with the aid of information relating to the channel quality for each transmission of said data between the base station and the mobile station, wherein the control unit includes channel allocation means for allocating in the event of erroneously transmitted data over a given channel at least one of the previous channels for earlier transmitted data in accordance with the transmission parameter created from said previous transmission.

37. A base station controller according to claim 36, wherein said previous transmission is the nearest preceding data transmission.

38. A base station controller according to claim 36, wherein the transmission parameter is based on information relating to the channel that was used for transmitting each given data between the base station and the mobile station.

39. A base station controller according to claim 38, wherein in the event of erroneously transmitted data over a given channel, the control unit allocates for re-transmission at maximum one channel from the previous channels used for the earlier transmission of data in which the number of occurrent errors was greater than a predetermined number $n_F$.

40. A base station controller according to claim 39, $N_F=0$.

41. A base station controller according to claim 39, wherein all channels that were used in a previous transmission, each transmitted data with more errors than $n_F$, the control unit allocates for re-transmission at least one further channel that was not used in the previous transmission, provided that one such channel is available.

42. A base station controller according to claim 38, wherein the control unit calculates for each used channel a quality measurement, $Q_z$, according to $Q_z$ $$= \frac{N_{tot} - N_{Nack}}{N_{tot}}$$

where $N_{tot}$ represents the total number of blocks that were transmitted on said channel and where $N_{Nack}$ denotes the number of blocks transmitted erroneously on said channel; there is allocated for re-transmission at maximum one channel of the previous channels used for previous transmitted data for which the quality measurement, $Q_z$, is below a predetermined quality limit, $Q_1$.

43. A base station controller according to claim 42, wherein $Q_1=0.9$.

44. A base station controller according to claim 42, wherein when the quality measurement, $Q_z$, for all channels that were used in a previous transmission is below $Q_1$, the control unit allocates for re-transmission at least one further channel that was not used in a previous transmission, provided that one such channel is available.

45. A base station controller according to claim 36, wherein said channel allocation means includes a processor and a memory unit; and the processor for each transmission of data between the base station and the mobile station creates said transmission parameter and stores said parameter in the memory unit.

46. In a radio communication system, a method for channel allocation comprising the steps of:

transmitting data over a plurality of channels from a primary station to a secondary station;

deriving a channel quality estimation for each of said plurality of channels; and selecting one of the plurality of channels, based upon said channel quality estimation, for retransmission of data that was erroneously transmitted, if a data transmission error occurs while transmitting said data over one of the plurality of channels.

* * * * *